(12) United States Patent
Choi et al.

(10) Patent No.: US 11,403,848 B2
(45) Date of Patent: Aug. 2, 2022

(54) ELECTRONIC DEVICE AND METHOD FOR GENERATING AUGMENTED REALITY OBJECT

(71) Applicant: Samsung Electronics Co., Ltd., Gyeonggi-do (KR)

(72) Inventors: Daiwoong Choi, Gyeonggi-do (KR); Hyunjin Kim, Gyeonggi-do (KR); Hongil Kim, Gyeonggi-do (KR); Laejung Park, Gyeonggi-do (KR); Byungjun Son, Gyeonggi-do (KR); Sanghun Lee, Gyeonggi-do (KR); Jiyoon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/934,256

(22) Filed: Jul. 21, 2020

(65) Prior Publication Data
US 2021/0034872 A1 Feb. 4, 2021

(30) Foreign Application Priority Data

Jul. 31, 2019 (KR) .................. 10-2019-0092906

(51) Int. Cl.
*G06V 20/00* (2022.01)
*G06V 20/20* (2022.01)
(Continued)

(52) U.S. Cl.
CPC ............. *G06V 20/20* (2022.01); *G06F 3/017* (2013.01); *G06T 19/006* (2013.01); *G06V 20/64* (2022.01); *G06V 40/161* (2022.01)

(58) Field of Classification Search
None
See application file for complete search history.

(56) References Cited

U.S. PATENT DOCUMENTS

| 5,592,597 A | 1/1997 | Kiss |
| 7,796,155 B1 | 9/2010 | Neely, III et al. |

(Continued)

FOREIGN PATENT DOCUMENTS

| KR | 10-2013-0072134 A | 7/2013 |
| KR | 10-1423524 B1 | 8/2014 |

(Continued)

OTHER PUBLICATIONS

International Search Report dated Nov. 20, 2020.
(Continued)

*Primary Examiner* — Martin Mushambo
(74) *Attorney, Agent, or Firm* — Cha & Reiter, LLC

(57) ABSTRACT

The present disclosure relates to an augmented reality (AR) enabled electronic device and method. The electronic device includes a camera, a display, touch input circuitry, a motion sensor, and a processor. The processor implements the method, including acquiring a preview image captured by the at least one camera, setting an object area and/or a space area in the preview image, displaying the acquired preview image on the display, detecting an input to the display using the touch input circuitry, determining whether the detected input requests application of an object-based drawing or a space-based drawing, and applying the object-based drawing or the space-based drawing to the to the acquired preview image according to the detected input.

20 Claims, 20 Drawing Sheets

(51) Int. Cl.
*G06T 19/00* (2011.01)
*G06F 3/01* (2006.01)
*G06V 20/64* (2022.01)
*G06V 40/16* (2022.01)

(56) References Cited

U.S. PATENT DOCUMENTS

| | | | |
|---|---|---|---|
| 8,854,342 B2 | 10/2014 | DiVerdi | |
| 8,896,579 B2 | 11/2014 | DiVerdi | |
| 9,147,251 B2 | 9/2015 | Broaddus et al. | |
| 10,997,766 B1* | 5/2021 | Hong | G06T 13/40 |
| 2005/0096589 A1* | 5/2005 | Shachar | A61B 1/00158 |
| | | | 604/95.01 |
| 2007/0242042 A1* | 10/2007 | Kelly | G06F 3/0346 |
| | | | 345/161 |
| 2013/0135315 A1* | 5/2013 | Bares | G11B 27/031 |
| | | | 345/473 |
| 2013/0229389 A1* | 9/2013 | DiVerdi | G06F 3/03545 |
| | | | 345/179 |
| 2013/0321340 A1* | 12/2013 | Seo | G06F 3/04883 |
| | | | 345/174 |
| 2013/0324152 A1* | 12/2013 | Lee | H04L 69/28 |
| | | | 455/456.1 |
| 2014/0123079 A1 | 5/2014 | Wu | |
| 2015/0070274 A1* | 3/2015 | Morozov | G02B 27/017 |
| | | | 345/156 |
| 2015/0199034 A1* | 7/2015 | Armstrong | G06F 3/016 |
| | | | 345/156 |
| 2015/0253908 A1* | 9/2015 | Go | G01D 5/12 |
| | | | 345/173 |
| 2015/0262029 A1* | 9/2015 | Pirchheim | G06T 3/00 |
| | | | 382/103 |
| 2015/0287338 A1* | 10/2015 | Wells | G09B 23/288 |
| | | | 702/19 |
| 2016/0140761 A1 | 5/2016 | Saunders | |
| 2017/0330362 A1 | 11/2017 | Sumner et al. | |
| 2018/0046874 A1* | 2/2018 | Guo | G06K 9/3208 |
| 2018/0059777 A1* | 3/2018 | Kobayashi | G06F 3/0346 |
| 2018/0101986 A1* | 4/2018 | Burns | G06F 3/0346 |
| 2018/0113589 A1* | 4/2018 | Hunleth | G06F 3/0482 |
| 2018/0182149 A1* | 6/2018 | Chong | G06T 11/60 |
| 2018/0314416 A1* | 11/2018 | Powderly | G06F 3/017 |
| 2019/0056844 A1* | 2/2019 | Kang | G06F 1/1677 |
| 2019/0072579 A1* | 3/2019 | Lee | G01P 13/02 |
| 2019/0098227 A1* | 3/2019 | Park | H04N 5/247 |
| 2019/0146598 A1* | 5/2019 | Peri | G06F 3/011 |
| | | | 345/158 |
| 2019/0228580 A1 | 7/2019 | Pelant et al. | |
| 2019/0279432 A1* | 9/2019 | Lin | G06T 19/20 |
| 2019/0362557 A1* | 11/2019 | Lacey | G06F 3/012 |
| 2020/0192486 A1* | 6/2020 | Schoessler | G06F 3/0346 |
| 2020/0356250 A1* | 11/2020 | Soli | G06F 3/04817 |

FOREIGN PATENT DOCUMENTS

| | | |
|---|---|---|
| KR | 10-1522919 B1 | 5/2015 |
| KR | 10-2017-0041098 A | 4/2017 |
| KR | 10-2017-0086077 A | 7/2017 |
| KR | 10-1944112 B1 | 4/2019 |
| KR | 10-2019-0081034 A | 7/2019 |

OTHER PUBLICATIONS

European Search Report dated Jun. 15, 2022.
Bibliographic Information for "Make simple drawings in AR with Just a Line" dated Mar. 20, 2018.

* cited by examiner

ELECTRONIC DEVICE AND METHOD FOR GENERATING AUGMENTED REALITY OBJECT

CROSS-REFERENCE TO RELATED APPLICATION(S)

This application is based on and claims priority under 35 U.S.C. § 119 to Korean Patent Application No. 10-2019-0092906, filed on Jul. 31, 2019, in the Korean Intellectual Property Office, the disclosure of which is herein incorporated by reference in its entirety.

BACKGROUND

Field

Certain embodiments relate to an electronic device and a method for enabling a user to easily and diversely generate an augmented reality (AR) object.

Description of Related Art

As communication terminals continue to evolve rapidly, they are increasingly equipped with various entertainment functions, in addition to core functionality such as voice communication. For example, with respect to photographic capture using a camera, there are functions that that add diversionary, entertaining effects, such as the addition of a sticker, a figure, a text, etc., to a captured image, thereby enhancing the user experience. Such function are not limited in application to a two-dimensional (2D) image, but also may be applied to an image or a video in which a three-dimensional (3D) object is photographed via augmented reality (AR). Various functions which involve the concept of AR continue to develop.

The above information is presented as background information only to assist with an understanding of the disclosure. No determination has been made, and no assertion is made, as to whether any of the above might be applicable as prior art with regard to the disclosure.

SUMMARY

When an augmented reality (AR) sticker is added to a captured image or video, there may be a limitation in that only previously generated stickers are used, without any capacity for additional effects or alterations in the sticker. As a result, the resulting composition image or video may become boring, reducing user satisfaction. In addition, in some cases, a user cannot find a sticker they wish to utilize.

Accordingly, certain embodiments of the disclosure provide an electronic device and a method for enabling a user to directly insert an AR object into an image or a preview image.

In addition, certain embodiments of the disclosure provide an electronic device and a method which distinguish between an object area and a space area, and generate an AR object which is fixed to and positioned on an object to be movable along with the object, and an AR object which is fixed at specific coordinates of the space area to be changed according to a movement of the electronic device.

In addition, certain embodiments of the disclosure provide am electronic device and a method which generate space information based on six degrees of freedom, individually track a plurality of objects on a preview image and individually enable a drawing area between a space and an object in real time, and draw an AR object.

The technical objects to be achieved by the disclosure are not limited to those mentioned above, and other technical objects that are not mentioned above may be clearly understood to those skilled in the art based on the description provided below.

According to certain embodiments of the disclosure, an electronic device may include: at least one camera configured to capture images, a display including a touch input circuitry, a motion sensor configured to detect a movement of the electronic device in at least six-degrees-of-freedom, at least one processor operatively connected with the at least one camera, the display, and the motion sensor, and at least one memory operatively connected with the at least one processor, such that the at least one memory stores instructions that, when executed, cause the at least one processor to: acquire a preview image captured by the at least one camera, set an object area and/or a space area in the preview image, display the acquired preview image on the display, detect an input to the display using the touch input circuitry, determine whether the detected input requests application of an object-based drawing or a space-based drawing, and apply the object-based drawing or the space-based drawing to the to the acquired preview image according to the detected input.

According to certain embodiments of the disclosure, an operating method of an electronic device may include: acquiring a preview image using a camera module, setting, by a processor, an object area and/or a space area in the preview image, displaying the preview image on a display, in response to detecting an input to the display via touch circuitry, determining whether object-based drawing or space-based drawing is to be applied, receiving an input of an augmented reality (AR) object to the preview image, and applying the AR object to the preview image according to the determined object-based drawing or the space-based drawing.

According to certain embodiments, the electronic device provides space-based drawing and object-based drawing, and provides a different tracking method according to a drawing method, such that an enhanced sense of immersion in AR and an effective AR drawing method can be provided.

In addition, according to certain embodiments, an effect achieved by separately drawing and tracking an individual object of a plurality of objects is provided, such that an enhanced sense of immersion and a fun factor can be provided to a user.

The effects achieved by certain embodiments are not limited to those mentioned above, and other effects that are not mentioned above may be clearly understood to those skilled in the art based on the description provided above.

BRIEF DESCRIPTION OF THE DRAWINGS

The above and other aspects, features, and advantages of certain embodiments of the disclosure will be more apparent from the following description taken in conjunction with the accompanying drawings, in which.

With regard to the description of the drawings, the same or similar reference numerals may be used to refer to the same or similar elements.

DETAILED DESCRIPTION

Hereinafter, certain embodiments will be described in detail with reference to the accompanying drawings.

Figure 1:
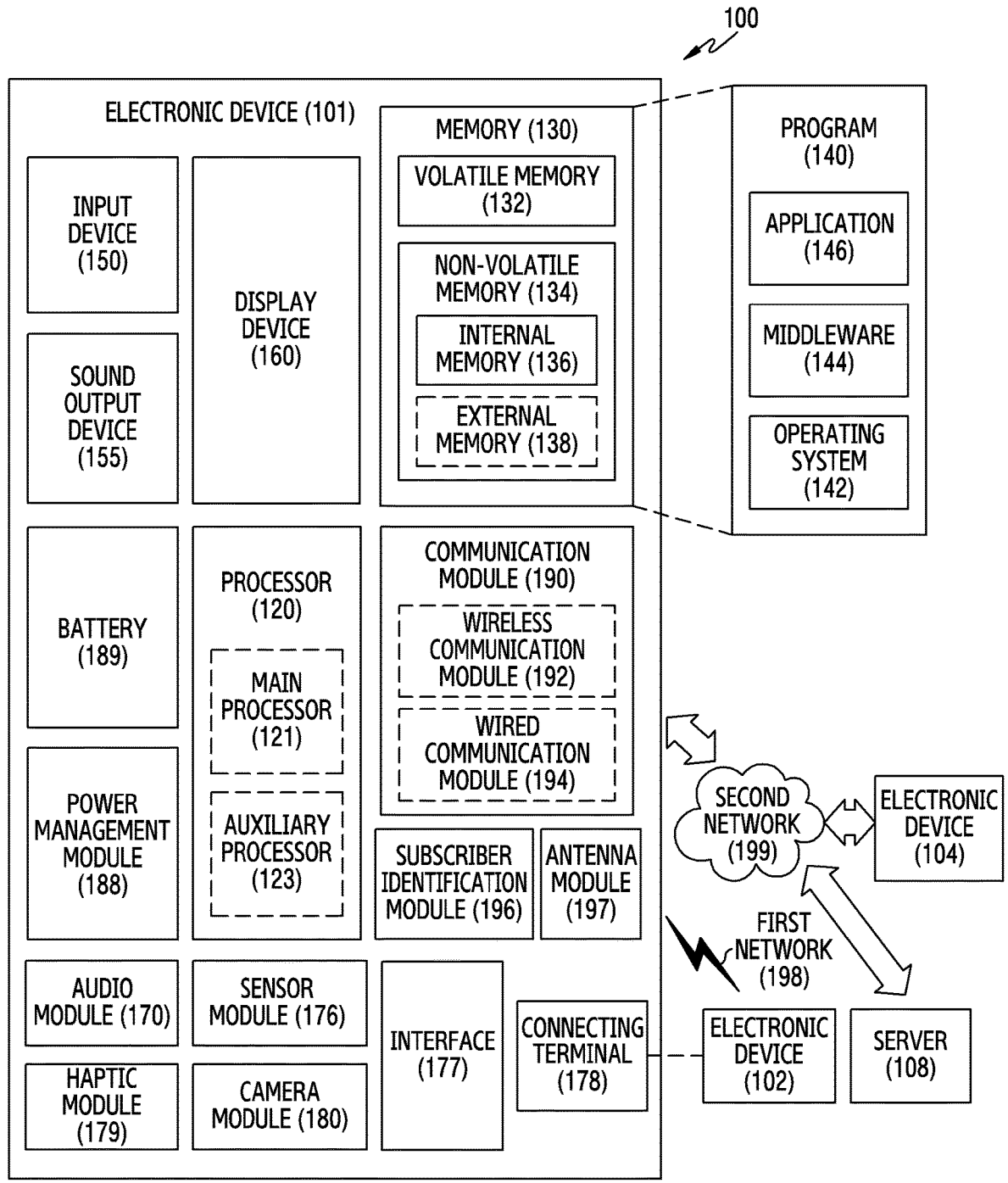
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134, which may include internal memory 136 and external memory 138. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
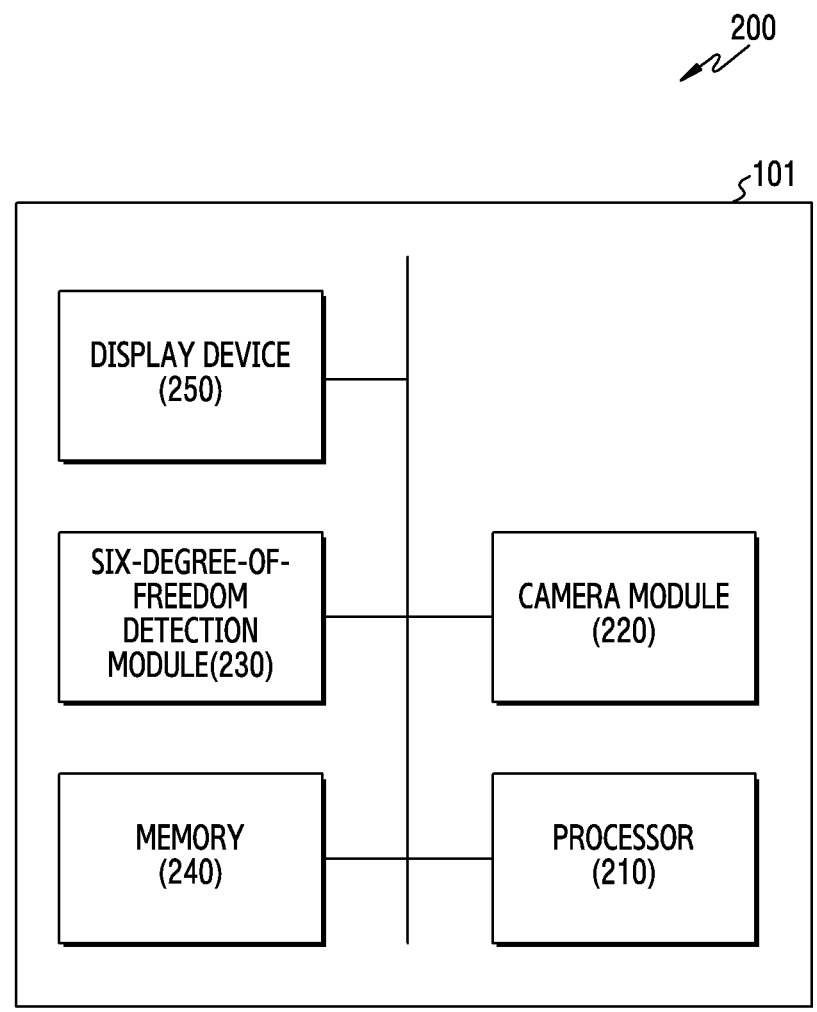
FIG. 2 is a view illustrating a configuration of an electronic device according to certain embodiments.

FIG. 2 is a view 200 illustrating a configuration of an electronic device according to certain embodiments. FIG. 2 schematically illustrates a functional configuration needed to implement a method suggested in the disclosure.

Referring to FIG. 2, the electronic device 101 may include at least one processor 210 (for example, the processor 120 of FIG. 1), a camera module 220 (for example, the camera module 180 of FIG. 1), a six-degree-of-freedom detection module 230 (for example, the sensor module 176 of FIG. 1), a memory 240 (for example, the memory 130 of FIG. 1) and/or a display device 250 (for example, the display device 160 of FIG. 1). However, this should not be considered as limiting, and at least one of these components of the electronic device 101 may be omitted or one or more other components may be added.

According to certain embodiments, the camera module 220 may shoot a still image and/or a video. According to an embodiment, the camera module 220 may include one or more lenses, one or more image sensors, one or more image signal processors, or one or more flashes. According to an embodiment, the camera module 220 may include a front-facing camera module which is disposed on a front surface of the electronic device 101, and mainly shoots an image including a user, and/or a rear-facing camera module which is disposed on a rear surface of the electronic device 101, and mainly shoots an image including objects other than the user. The camera module 220 may employ a wide angle lens, a ultra-wide angle lens according to an embodiment, and may include a time-of-flight ("ToF") camera for determining a distance to an object according to another embodiment. When the ToF camera is used, stability in generating a space coordinate system can be enhanced and performance of extraction of an area of an object can be enhanced.

According to certain embodiments, the display device 250 is a device that visually provides information to the outside of the electronic device 101, and may include a control circuitry for controlling a display and a corresponding device. According to an embodiment, the display device 250 may include a touch circuitry set to detect a touch, or a sensor circuitry (for example, a pressure sensor) set to measure a strength of force generated by the touch. The still image and/or video shot by the camera module 220 may be displayed on the display device 250. In addition, the electronic device 101 may recognize a touch input such as an AR object input of a user, based on the touch circuitry or the sensor circuitry included in the display device 250.

According to certain embodiments, the six-degree-of-freedom detection module 230 (e.g., a motion detecting sensor, such as a gyroscopic sensor) may detect information of six degrees of freedom of the electronic device 101. Three degrees of freedom out of the six degrees of freedom may indicate information regarding a position or a movement, and the other three degrees of freedom may indicate information regarding an orientation.

According to certain embodiments, the six-degree-of-freedom detection module 230 may include at least one of a gyro sensor, an acceleration sensor, an inertia sensor, a geomagnetic sensor.

Figure 3:
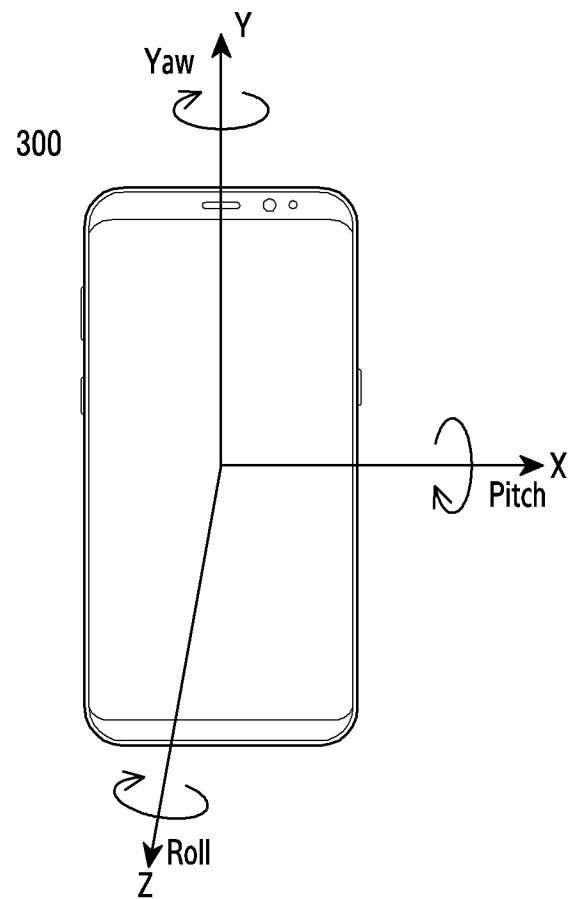
FIG. 3 is a view illustrating six degrees of freedom according to certain embodiments.

FIG. 3 is a view 300 illustrating six degrees of freedom (e.g., six degrees of detectable types of movements) according to certain embodiments.

Referring to FIG. 3, three degrees of the total six degrees of freedom (e.g., movements) may be movement along the X, Y, Z axes (e.g., panning movements in the X, Y and Z direction), and may provide position information of the electronic device 101. The remaining three degrees of freedom (e.g., movement) may indicate a rotation about the X-axis (i.e., pitch), a rotation value about the Y-axis (i.e., yaw), and a rotation value about the Z-axis (i.e., roll), and may provide orientation information of the electronic device 101.

The six-degree-of-freedom detection module 230 (e.g., a motion sensor) may not only detect position information of the electronic device 101 and movement information resulting therefrom, but also may acquire orientation information of the electronic device 101, by detecting six degrees of freedom of the electronic device 101. The detected six-degree-of-freedom information may be a basis for displaying an AR object on the screen.

Figure 4A:
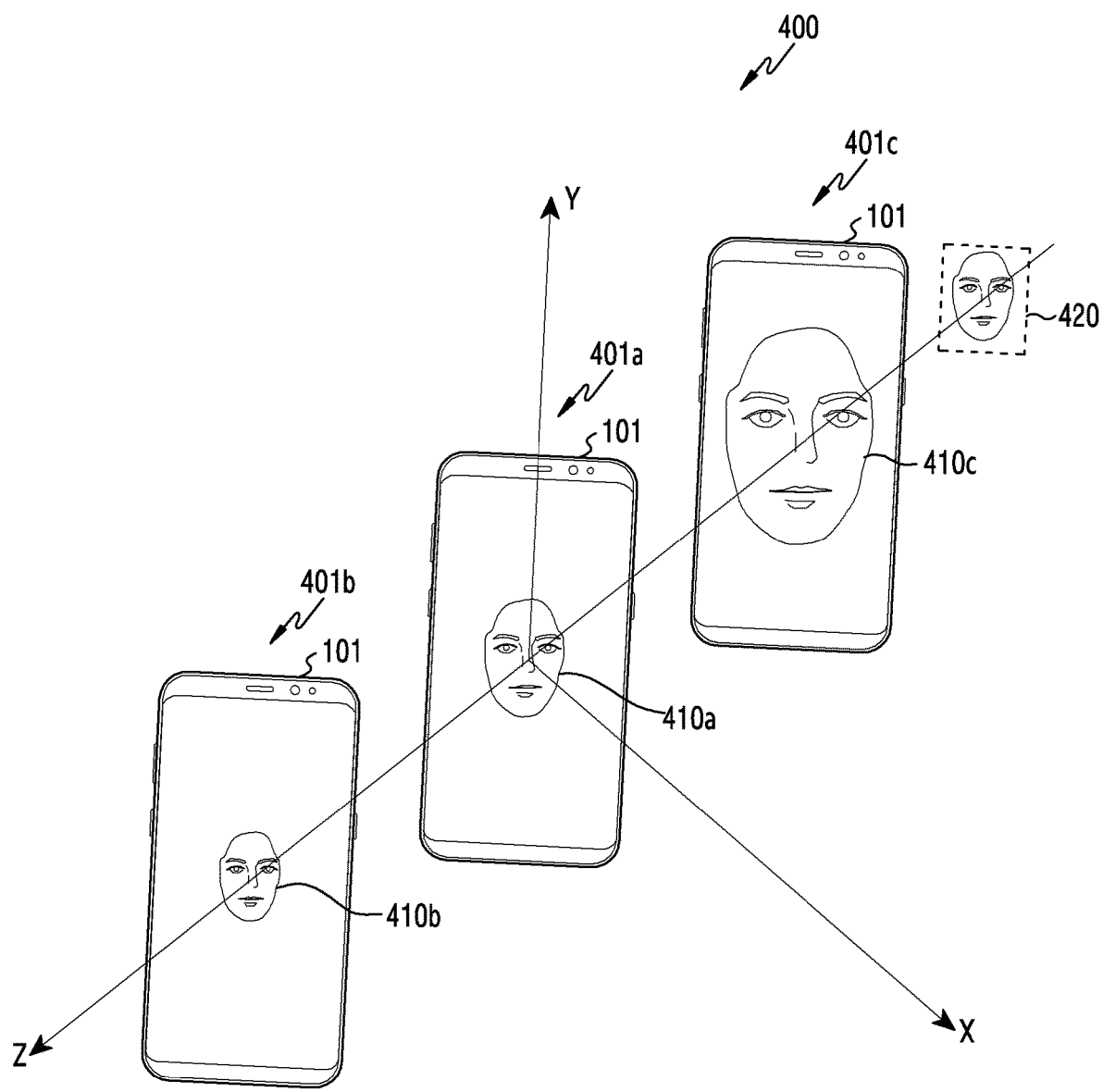
FIG. 4A is a view illustrating an example of change of an AR object displayed on a screen, based on six degrees of freedom according to certain embodiments.
Figure 4B:
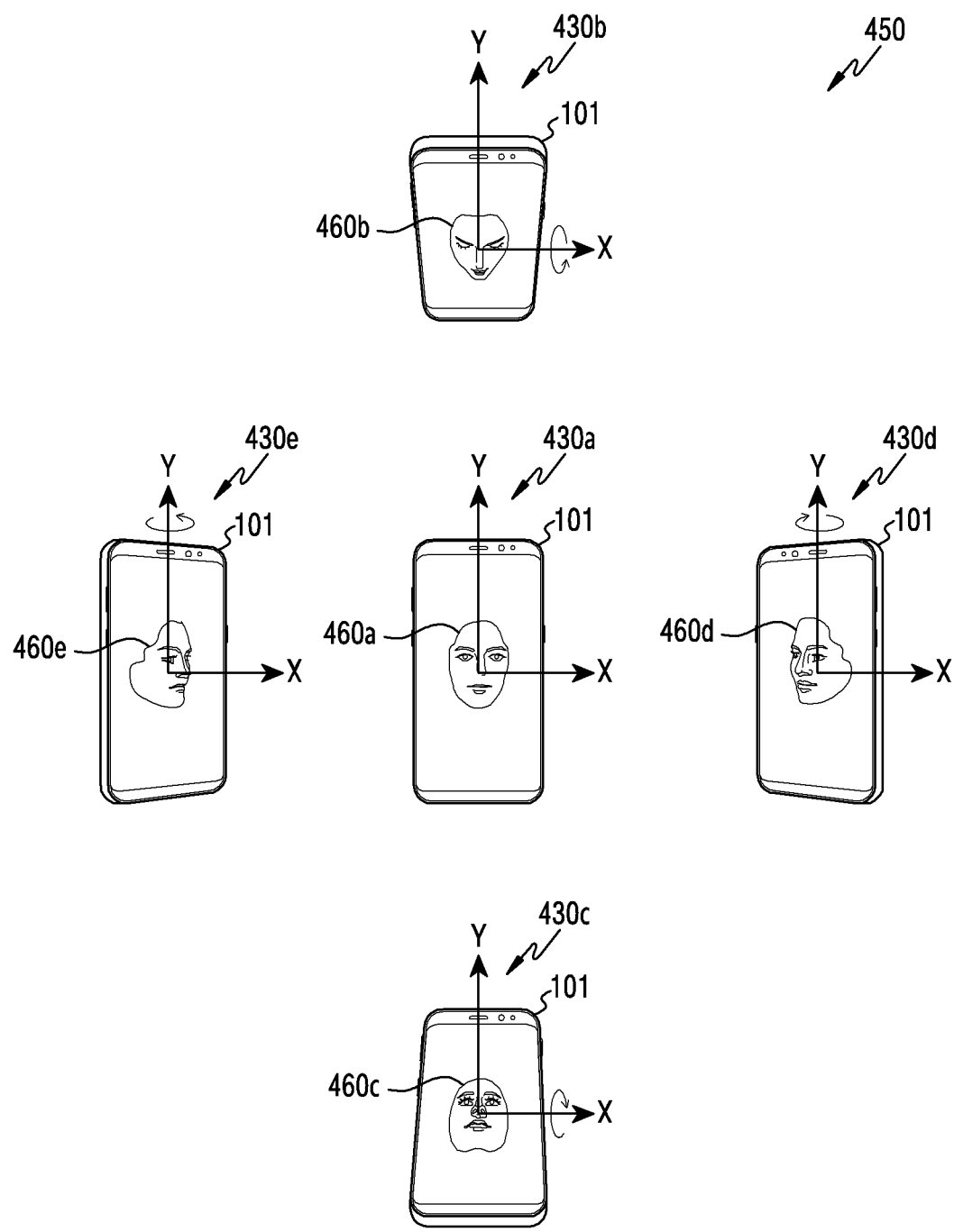
FIG. 4B is a view illustrating an example of change of an AR object displayed on a screen, based on six degrees of freedom according to certain embodiments.

FIG. 4A is a view 400 illustrating an example of change of an AR object displayed on the display device 160 of the electronic device 101, based on six degrees of freedom, according to certain embodiments, and FIG. 4B is a view 450 illustrating an example of change of an AR object displayed on the display device 160 of the electronic device 101, based on six degrees of freedom, according to certain embodiments.

FIG. 4A illustrates an example of change of an AR object displayed on the display device 250 of the electronic device 101 according to a position change of the electronic device 101.

Referring to FIG. 4A, an AR object 420 existing at a virtual specific position (for example, X=0, Y=0, Z=−2) with reference to a position (for example, X=0, Y=0, Z=0) and an orientation (for example, Roll=0, Pitch=0, Yaw=0) of the electronic device 101, shown in 401a, may be shown on the display device 250 of the electronic device 101 (410a).

When the electronic device 101 moves to a new position (for example, X=0, Y=0, Z=1) shown in 401b, the electronic device 101 may be further away from the AR object 420 existing at the virtual specific position (for example, X=0, Y=0, Z=−2). Accordingly, the AR object 410b displayed on the display device 250 of the electronic device 101 may have its size reduced, based on the increasing distance. When the electronic device 101 gradually moves in the +Z direction, the AR object 410b displayed on the display device 250 of the electronic device 101 may become smaller according to the movement of the electronic device 101.

When the electronic device 101 moves in the −Z direction and moves to a new position (for example, X=0, Y=0, Z=−1) shown in 401c, the electronic device 101 may be closer to the AR object 420 existing at the virtual specific position (for example, X=0, Y=0, Z=−2). Accordingly, the AR object 410c displayed on the display device 250 of the electronic device 101 may have its size increased, based on the reduced distance, compared to that when the electronic device 101 is at the reference position of 401a. When the electronic device 101 gradually moves in the −Z direction, the AR object 410c displayed on the display device 250 of the electronic device 101 may become larger according to the movement of the electronic device 101. The above-described feature is that the AR object displayed on the display device 250 of the electronic device 101 changes according to the movement of the electronic device 101 in the Z direction, and may be similarly applied to the case where the electronic device 101 moves in the X-direction and/or Y-direction.

FIG. 4B illustrates an example of change of an AR object displayed on the display device 250 of the electronic device 101 according to an orientation change of the electronic device 101.

Referring to FIG. 4B, the AR object 420 existing at a virtual specific position (for example, X=0, Y=0, Z=−2) with reference to a position (for example, X=0, Y=0, Z=0) and an orientation (for example, Roll=0, Pitch=0, Yaw=0) of 430a of the electronic device 101 may be shown on the display device 250 of the electronic device 101 (460a).

When the electronic device 101 changes its orientation and the pitch alone is changed, the AR object 460b, 460c displayed on the display device 250 of the electronic device 101 may change the orientation in which the AR object is shown, and may be displayed. In an embodiment, when the pitch of the electronic device 101 is changed to the right with reference to the X-axis as shown in 430b, the AR object 460b displayed on the display device 250 of the electronic device 101 may be changed as shown in 430b. In another embodiment, when the pitch of the electronic device 101 is changed to the left with reference to the X-axis as shown in 430c, the AR object 460c displayed on the display device 250 of the electronic device 101 may be changed as shown in 430c.

When the electronic device 101 changes its orientation and the yaw is changed, the AR object 460d, 460e displayed on the display device 250 of the electronic device 101 may change the orientation in which the AR object is shown and may be displayed. In an embodiment, when the yaw of the electronic device 101 is changed to the right with reference to the Y-axis as shown in 430d, the AR object 460d displayed on the display device 250 of the electronic device 101 may be changed as shown in 430d. In another embodiment, when the yaw of the electronic device 101 is changed to the left with reference to the Y-axis as shown in 430e, the AR object 460e displayed on the display device 250 of the electronic device 101 may be changed as shown in 430e.

As described above, a shape (a size and an orientation) of the AR object existing in the electronic device 101 may be changed based on a position and/or an orientation of the electronic device 101.

According to certain embodiments, the six-degree-of-freedom information of the electronic device 101 detected by the six-degree-of-freedom detection module 230 may also be a basis for position information and orientation information of an AR object to be inserted into a preview image acquired by the camera module 220.

Figure 5A:
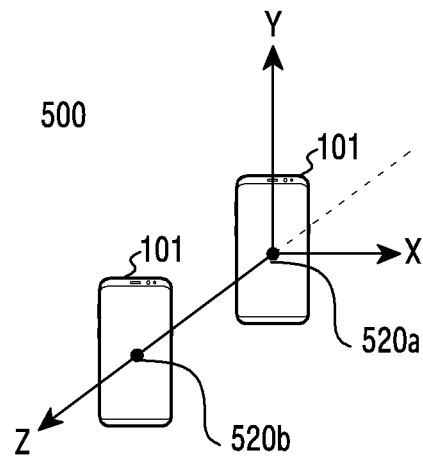
FIG. 5A is a view illustrating an example of determining a position of an AR object to be inserted into a display device, based on six degrees of freedom according to certain embodiments.
Figures 5B, 5C, 5D:
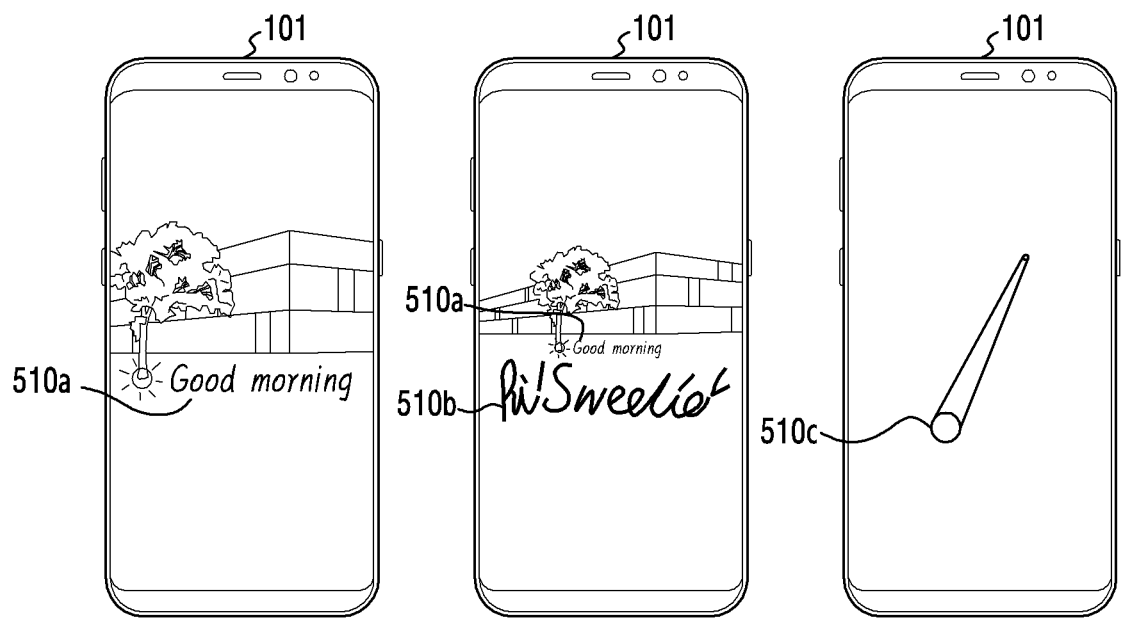
FIG. 5B is a view illustrating an example of determining a position of an AR object to be inserted into a display device, based on six degrees of freedom according to certain embodiments.
FIG. 5C is a view illustrating an example of determining a position of an AR object to be inserted into a display device, based on six degrees of freedom according to certain embodiments.
FIG. 5D is a view illustrating an example of determining a position of an AR object to be inserted into a display device, based on six degrees of freedom according to certain embodiments.

FIG. 5A is a view 500 illustrating an example of determining a position of an AR object to be inserted into the display device 250, based on six degrees of freedom according to certain embodiments, FIG. 5B is a view 500 illustrating an example of determining a position of an AR object to be inserted into the display device 250, based on six degrees of freedom according to certain embodiments, FIG. 5C is a view 500 illustrating an example of determining a position of an AR object to be inserted into the display device 250, based on six degrees of freedom according to certain embodiments, and FIG. 5D is a view 500 illustrating an example of determining a position of an AR object to be inserted into the display device 250, based on six degrees of freedom according to certain embodiments.

Referring to FIGS. 5A and 5B, the electronic device 101 may identify an input of an AR object 510a as shown in FIG. 5B at a specific position 520a (for example, X=0, Y=0, Z=0) shown in FIG. 5A. In this case, the AR object 510a inputted by the user may be set as being positioned at a specific position (for example, X=0, Y=0, Z=−1) with reference to the current position of the electronic device 101. In an embodiment, the AR object 510a inputted by the user may be set as being positioned at the specific position (for example, X=0, Y=0, Z=−1) on the world coordinate system with reference to the current position 520a of the electronic device 101. An initial set position may be arbitrarily set. Thereafter, when the electronic device 101 moves to a second position 520b (for example, X=0, Y=0, Z=1), the AR object 510a may be displayed in a small size as shown in FIG. 5C, as described above in FIG. 4A. In addition, the user may input a second AR object 510b. In this case, the inputted second AR object 510b may reflect the moved position 520b of the electronic device 101. In an embodiment, the result of adding a position vector (for example, X=0, Y=0, Z=−1) of the AR object 510a at the time of initially setting to the current position 520b (for example, X=0, Y=0, Z=1) of the electronic device 101 may indicate a position (for example, X=0, Y=0, Z=0) of the newly inputted second AR object 510b on the world coordinate system.

According to another embodiment, an AR object 510c having different depths when the electronic device 101 moves with a user input may be generated. According to an embodiment, when the user moves the electronic device 101 from the first position 520a (for example, X=0, Y=0, Z=0) shown in FIG. 5A to the second position 520b (for example, X=0, Y=0, Z=1) while touching the same position of the display device 250 of the electronic device 101, the AR object 510c of a 3D path shape connecting the first position 520a and the second position 520b may be generated as shown in FIG. 5D. In this case, the 3D path shape of the AR object 510c may be determined based on an orientation and a track of the electronic device 101 which are changed according to the movement from the first position 520a to the second position 520b.

According to certain embodiments, the electronic device 101 may set position information and orientation information of a generated AR object, based on position information and orientation information of the electronic device 101 acquired in the six-degree-of-freedom detection module 230. In addition, the electronic device 101 may generate AR object information including the set position information, orientation information, and shape information of the AR object, and may store the AR object information in the memory 240.

According to certain embodiments, the memory 240 may store instructions to be executed by the processor 210 to implement operations of the disclosure, which will be described below. In addition, the memory 240 may store an AR object generated in the disclosure. In addition, the memory 240 may store a still image or a video to which AR objects generated by a user are applied.

According to certain embodiments, the at least one processor 210 may generate an AR object based on a user input, and may apply the generated AR object to a still image or a preview image shot in the camera module.

Figure 6:
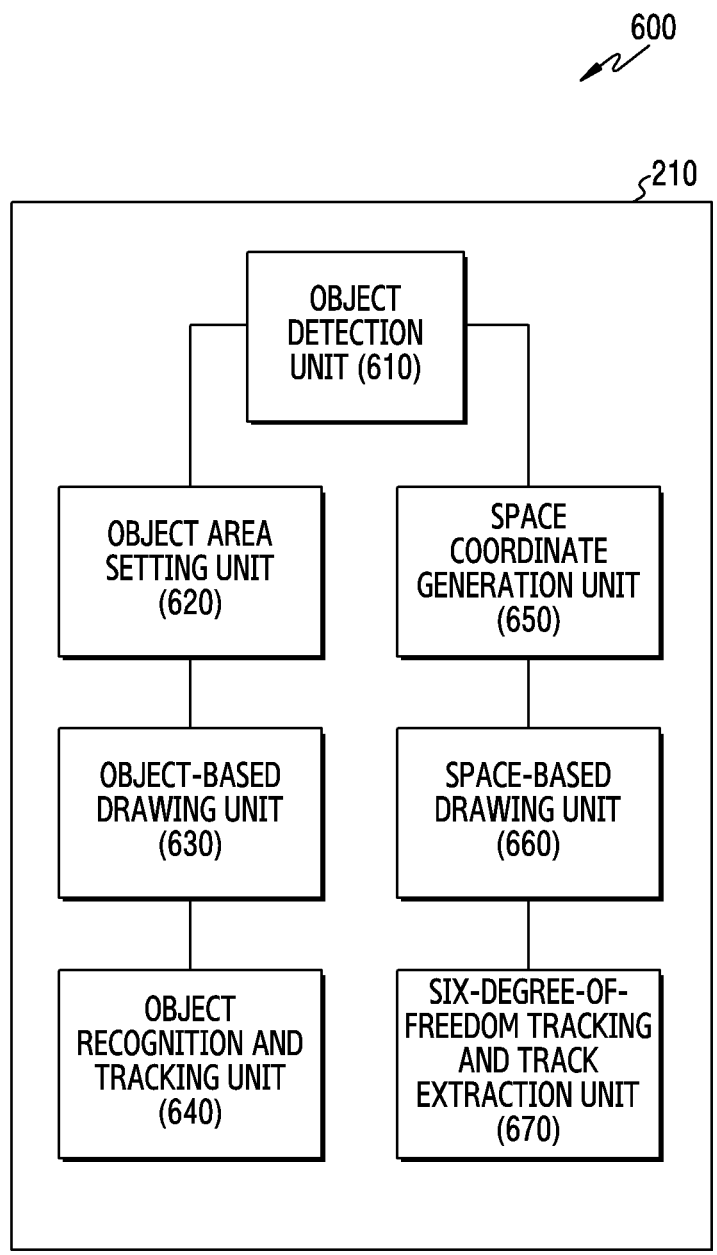
FIG. 6 is a block diagram of functions performed by at least one processor 210 according to certain embodiments.

FIG. 6 is a block diagram 600 of functions performed by the at least one processor 210 according to certain embodiments.

Referring to FIG. 6, the at least one processor 210 may include functions of an object detection unit 610, an object area setting unit 620, an object-based drawing unit 630, an object recognition and tracking unit 640, a space coordinate generation unit 650, a space-based drawing unit 660, and a six-degree-of-freedom tracking and track extraction unit 670. However, this should not be considered as limiting, and at least one of these functions may be omitted or one or more other functions may be added, or some functions may be combined. The above-described respective units may be executed by the at least one processor 210 as software.

According to certain embodiments, the object detection unit 610 may determine whether there exists an object in a preview image shot in the camera module 220, and may detect an object. According to an embodiment, the object may be a person's face, but this should not be considered as limiting. For example, the object detection unit 610 may detect an object like an animal, a car. According to another embodiment, the object may be a planar area where the user can draw. According to still another embodiment, the object may be a specific area or a specific point which is inputted by the user.

According to an embodiment, when an object is detected by the object detection unit 610, the processor 120 may enable an object-based drawing function. The object-based drawing function may include the object area setting unit 620, the object-based drawing unit 630, and the object recognition and tracking unit 640. In addition, when an object is not detected by the object detection unit 610, the processor 120 may enable a space-based drawing function. The space-based drawing function may include the space coordinate generation unit 650, the space-based drawing unit 660, and the six-degree-of-freedom tracking and track extraction unit 670.

According to another embodiment, when the electronic device 101 is not able to support an application or a program (for example, "ARcore" or "ARkit") to perform the space-based drawing function, the object-based drawing function may be enabled regardless of whether an object is detected by the object detection unit 610. According to an embodiment, when the electronic device 101 is able to support the application to perform the space-based drawing function, but the corresponding application is not installed, the electronic device 101 may download and install the corresponding application and then may enable the space-based drawing function.

According to still another embodiment, when an object is detected by the object detection unit 610, the processor 210 of the electronic device 101 may enable both the object-based drawing function and the space-based drawing function, and may perform the object-based drawing function or perform the space-based drawing function, based on a user input.

According to certain embodiments, when the object-based drawing function is enabled, the object area setting unit 620 may set an object area based on at least one object detected by the object detection unit 610. In an embodiment, when the object detected by the object detection unit 610 is a face, the object area may be set to be slightly larger than the face area. In another embodiment, when the detected object is a planar area where the user can draw or a planar area where a memo can be written, the object area setting unit 620 may set the detected planar area as the object area. In still another embodiment, when the object is a specific area or a specific point that is inputted through interaction with the user, the object area setting unit 620 may set the corresponding specific area as the object area, or may set, as the object area, a circle having a predetermined radius with reference to the corresponding specific point, or a rectangular area having a constant distance to vertexes from the corresponding point.

According to an embodiment, the electronic device 101 may set the object area differently based on a position, a direction, a size of the detected object.

Figures 7A, 7B, 7C:
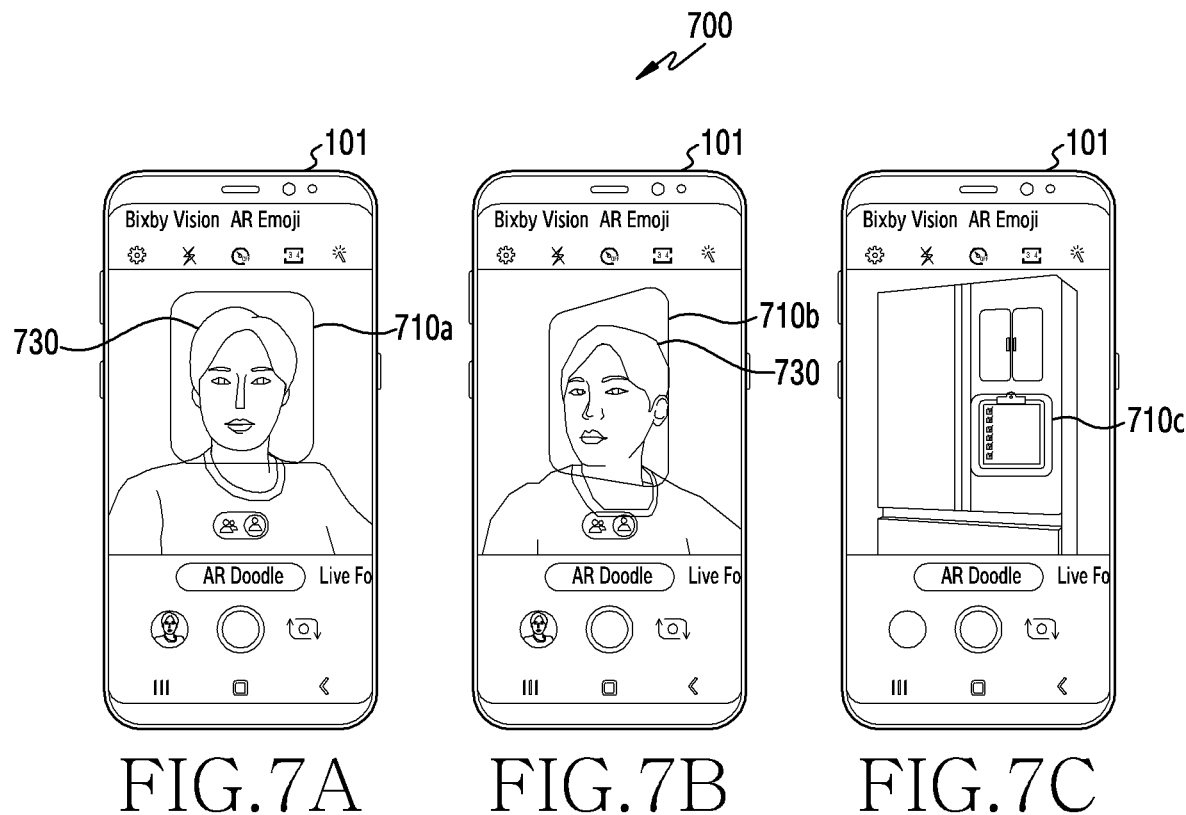
FIG. 7A is a view illustrating an example of setting an object area according to certain embodiments.
FIG. 7B is a view illustrating an example of setting an object area according to certain embodiments.
FIG. 7C is a view illustrating an example of setting an object area according to certain embodiments.
Figure 7D:
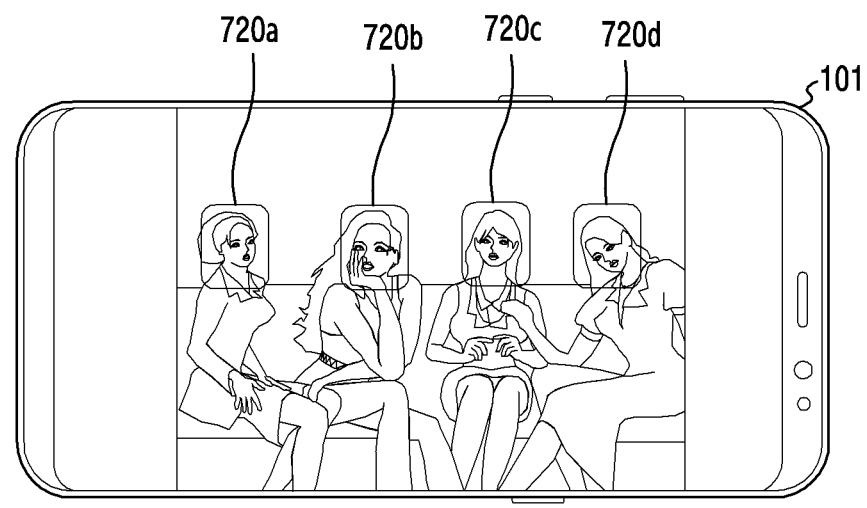
FIG. 7D is a view illustrating an example of setting an object area according to certain embodiments.

FIG. 7A is a view 700 illustrating an example of setting an object area according to certain embodiments, FIG. 7B is a view 700 illustrating an example of setting an object area according to certain embodiments, FIG. 7C is a view 700 illustrating an example of setting an object area according to certain embodiments, and FIG. 7D is a view 700 illustrating an example of setting an object area according to certain embodiments.

FIG. 7A illustrates an example of detecting a face 730 as an object. The face 730 is facing front towards the display device 250 of the electronic device. The electronic device displays an object area 710a on the periphery of the face 730 as captured in the preview image. According to certain embodiments, the electronic device 101 may display the object area 710a by adding a layer or a transparent window to the display device 250, or may display the object area 710a by drawing a rectangular box on the periphery of the object.

According to certain embodiments, the object area 710a may be changed according to a change detected in the corresponding object. In an embodiment, when the detected face 730 turns by a predetermined angle from the front as shown in FIG. 7B, the border representing the object area 710*a* on the periphery of the detected face 730 may turn by the predetermined angle, accordingly, such that a new border representing the object area 710*b* is displayed.

According to certain embodiments, as shown in FIG. 7C, the electronic device 101 may acquire 3D restoration information regarding an image displayed on the display device 250, detect surface information and/or a planar surfaces where the user can draw in the 3D restoration information, and may set an area including the detected surface or planar surface as an object area 710*c*.

According to certain embodiments, as shown in FIG. 7D, the electronic device 101 may detect a plurality of objects in an image displayed on the display device 250, and may set object areas 720*a*, 720*b*, 720*c*, 720*d* corresponding to the detected plurality of objects, respectively.

According to certain embodiments, the object-based drawing unit 630 may draw an AR object based on an object in response to a user input.

According to certain embodiments, the electronic device 101 may display the set object area 710*a*, 710*b*, 710*c*, 720*a*, 720*b*, 720*c*, 720*d* on the display device 250 to show the object area to the user, and according to another embodiment, the electronic device 101 may internally use the set object area 710*a*, 710*b*, 710*c*, 720*a*, 720*b*, 720*c*, 720*d* and may not show the object area to the user.

Figure 8A:
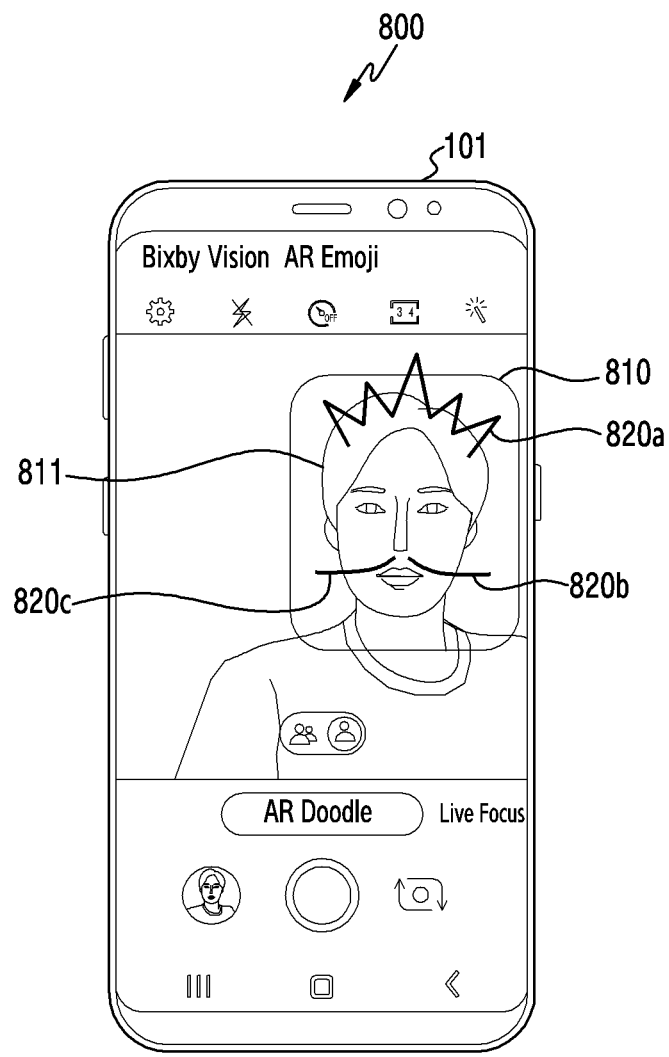
FIG. 8A is a view illustrating an operation of an object-based drawing unit which inserts an AR object into a preview image according to a user input according to certain embodiments.

FIG. 8A is a view 800 illustrating an operation of the object-based drawing unit which inserts an AR object into a preview image according to a user input according to certain embodiments.

When the object-based drawing unit 630 is executed, the object-based drawing unit 630 may provide a palette on which the user may input drawing markings, through the display device 250, and may await a user input. In an embodiment, the electronic device 101 may detect a user input using a touch circuitry included in the display device 250. According to another embodiment, the object-based drawing unit 630 may provide another layer, different from a layer on which an image is displayed, or a separate window to display the user input (e.g., drawing markings) on the display device 250.

Referring to FIG. 8A, the object-based drawing unit 630 may determine a user drawing input starting in an object area 810 as an input of an object-based AR object 820*a*, 820*b*, 820*c*, and may position the AR object 820*a*, 820*b*, 820*c* input by the user in association with a corresponding object 811 of the object area 810. In an embodiment, the object-based drawing unit 630 may set an association relationship between the object 811 and the AR objects 820*a*, 820*b*, 820*c*, which include a relative distance and direction between the center of the corresponding object 811 of the object area 810 and the AR object 820*a*, 820*b*, 820*c* inputted by the user, and may store the association relationship in the memory 240. This will allow the AR objects to move in tandem with the object 811 in relation to the set center of the corresponding object 811, when the object 811 moves in the preview image. In addition, the object-based drawing unit 630 may additionally associate a feature point of the object 810 and may store the feature point. As described above, the object-based drawing unit 630 may associate the AR object 820*a*, 820*b*, 820*c* drawn by the user with the corresponding object, and may display the AR object. Additionally, the object-based drawing unit 630 may associate the AR object 820*a*, 820*b*, 820*c* with the corresponding object and store the AR object and the object, such that the associated AR object can be displayed afterward, along with the object, based on the object tracked by the object recognition and tracking unit 640.

According to certain embodiments, when the detected object is a face, the object-based drawing unit 630 may divide the face into a plurality of sub areas for drawing of better quality and may provide a plate for allowing the user to draw thereon. The plate may be a virtual canvas on which the user can draw.

Figure 8B:
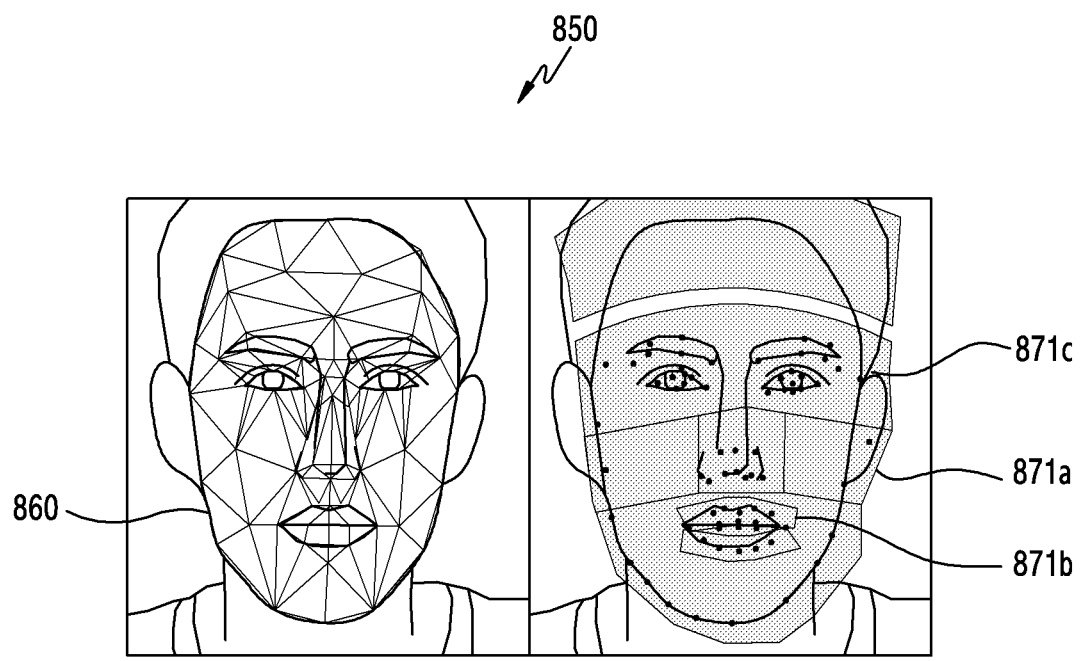
FIG. 8B is a view illustrating an example of dividing an image of a face into a plurality of sub areas where a user can draw, and providing the sub areas according to certain embodiments.

FIG. 8B is a view 850 illustrating an example of dividing a face into a plurality of sub areas and providing one or more plates on the display, each plate allowing a user to input drawing markings thereon, according to certain embodiments.

Referring to FIG. 8B, the object-based drawing unit 630 may detect facial features including depth (for example, a length in the Z-axis of FIG. 3), slope, curvature, etc. for a number of surface on the detected face, and may divide the face into a plurality of sub areas according to the detected facial features. In addition, the object-based drawing unit 630 may provide a plate on which a user can input drawing markings with respect to each of the sub areas, based on the features of each sub area. For example, the object-based drawing unit 630 may divide the face into sub areas having different features, such as forehead, eyes, cheeks, lips, ears (e.g., as seen in FIG. 8B, plates are provided for the hair, the brow/eyes, the nose, upper cheeks, the jaw and the upper and lower lips), and may provide plates corresponding to each sub area. Thus, the user can input drawing markings for the hair, brow/eyes, nose, upper cheeks, jaw and upper/lower lips, using the respective plates for each.

According to certain embodiments, the object-based drawing unit 630 may generate a 3D mesh 860 based on facial "landmark" features, regarding the face as shown in FIG. 8B, and may generate a plurality of plates through clustering. In an embodiment, the object-based drawing unit 630 may generate and provide a plate 871*a* virtually sloping from the center of cheekbone at an angle of about 1-2 degrees relative to a curved surface of the cheek, such that the user can draw mustache. The user may draw on the provided plate. In another embodiment, with respect to a lip sub area, the object-based drawing unit 630 may provide a plate 871*b* on the periphery of a user's lips as depicted in the preview image, according to a curvature of the surface of the lip (as detected via depth perception). The user may draw along the displayed curved surface of the lips on the periphery of the lips, based on the provided plate 871*b*, such that quality of an AR object can be enhanced. In still another embodiment, the object-based drawing unit 630 may provide a plate 871*c* floating above the face on the periphery of the eyes, for example, floating N cm above the bridge of the nose in the Z-axis direction, such that the user can draw eyeglasses on the periphery of the eyes.

According to certain embodiments, when the detected object is 3D-restored surface information or a planar surface, or is an object other than the face, the object-based drawing unit 630 may generate and display a single plate regarding the corresponding object. In an embodiment, when a top surface of a desk depicted in the preview image is detected as an object, the object-based drawing unit 630 may generate and provide a single plate for drawing with respect to an area occupied by the desk. In addition, the object-based drawing unit 630 may generate a plate having a slope, based on a slope of a planar surface of the recognized object (for example, the top surface of the desk). According to an embodiment, when the slope of the planar surface of the recognized object is greater than a threshold value, the object-based drawing unit 630 may generate a plate having an appropriate slope.

As described above, the object-based drawing unit 630 may divide the object area into specific sub areas so as to allow the user to draw according to the feature of the detected object, and may generate the plate having the feature corresponding to a corresponding sub area and provide the plate, such that the user can easily draw adaptively to the feature of the corresponding sub area. According to an embodiment, the object-based drawing unit 630 may display an area of the provided plate on the display device 250, and according to another embodiment, may not explicitly display the plate area. When a user input is within the corresponding plate, the object-based drawing unit 630 may allow the user to draw according to the feature of the plate even if the plate is not explicitly displayed. In an embodiment, when the plate slopes, the object-based drawing unit 630 may allow a user input on the corresponding plate to be drawn according to the sloping plate.

According to certain embodiments, the object recognition and tracking unit 640 may detect an object appearing in an image shot by the camera module 220, and may track the object. In addition, the object recognition and tracking unit 640 may display an AR object associated with the detected object on the image displayed on the display device 250. The object recognition and tracking unit 640 may identify and use feature points of the detected object to search the AR object associated with the detected object. In an embodiment, information of the AR object associated with the detected object may be stored in the memory 240. The information of the AR object may include position information including a relative distance and direction to the center point of the detected object, and shape information of the AR object.

Figures 9A, 9B:
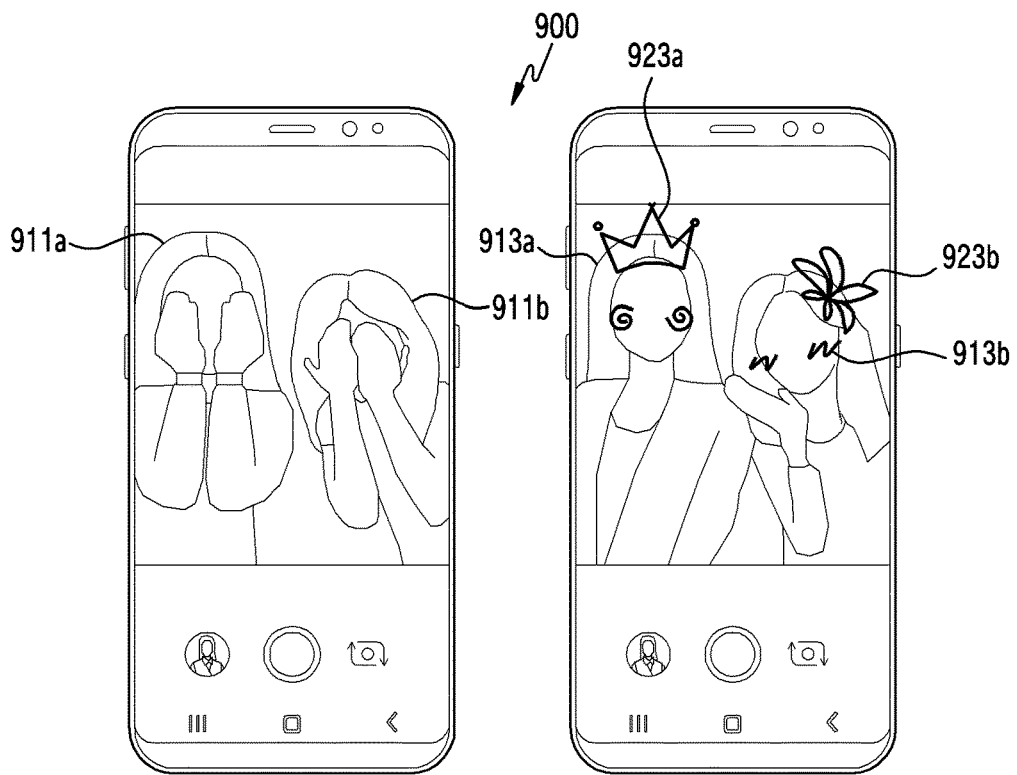
FIG. 9A is a view illustrating an AR object which is displayed by an operation of an object recognition and tracking unit according to certain embodiments.
FIG. 9B is a view illustrating the AR object which is displayed by the operation of the object recognition and tracking unit according to certain embodiments.
Figure 9C:
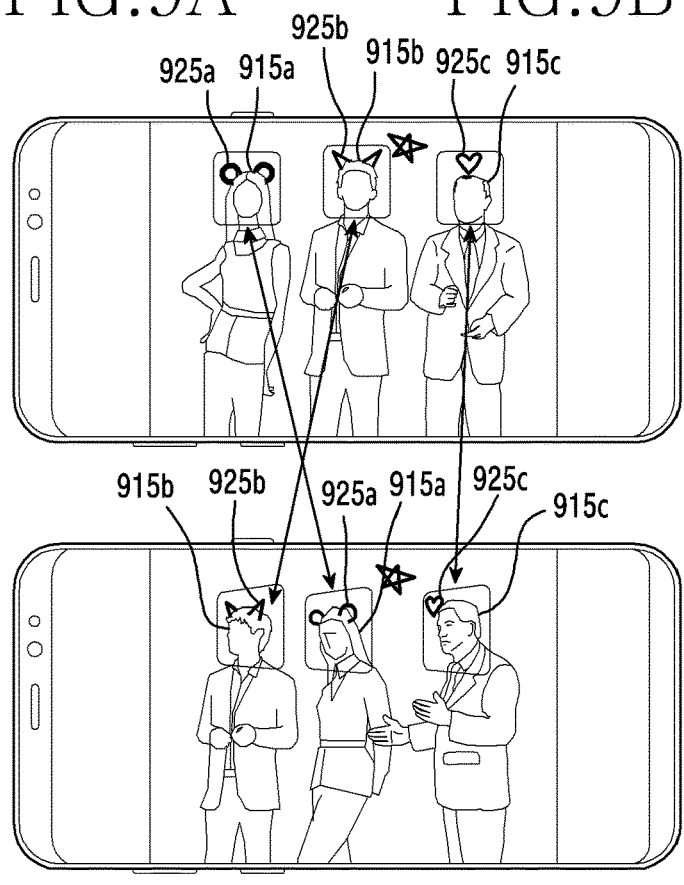
FIG. 9C is a view illustrating an AR object which is displayed by the operation of the object recognition and tracking unit according to certain embodiments.

FIG. 9A is a view 900 illustrating an AR object displayed by an operation of the object recognition and tracking unit 640 according to certain embodiments, FIG. 9B is a view illustrating an AR object displayed by the operation of the object recognition and tracking unit 640 according to certain embodiments, and FIG. 9C is a view illustrating an AR object displayed by the operation of the object recognition and tracking unit 640 according to certain embodiments.

Referring to FIGS. 9A, 9B, 9C, the object recognition and tracking unit 640 may detect an object included in a preview image, and may execute a search for an AR object associated with the detected object 911a, 911b. When no AR object associated with the detected object 911a is detected, 911b as shown in FIG. 9A, the object recognition and tracking unit 640 may not display the AR object on the display device 250. When an AR object 923a, 923b associated with a detected object 913a, 913b is detected through the executed search as shown in FIG. 9B, the object recognition and tracking unit 640 may display the detected AR object 923a, 923b on the display device 250. According to an embodiment, the object recognition and tracking unit 640 may display the AR object 923a, 923b that was detected in the search as associated with the object 911a, 911b, detected within the preview image on the display device 250.

According to certain embodiments, the object recognition and tracking unit 640 may recognize the object 913a, 913b in the preview image, may display the AR object 923a, 923b associated with the corresponding object 913a, 913b on the screen, and may display the associated AR object 923a, 923b to move along with the corresponding object 913a, 913b according to a change in the movement of the corresponding object 913a, 913b. For example, referring to FIG. 9C, a plurality of objects 915a, 915b, 915c may be displayed along with associated AR objects 925a, 925b, 925c, and the associated AR objects may perform the same movement according to movements of the objects. The object recognition and tracking unit 640 may enable the AR object (for example, 925a) associated with the object (for example, 915a) to move altogether. According to an embodiment, the object recognition and tracking unit 640 may store, as association information, information of a distance and a direction between the center of the object (for example, 915a) and the associated AR object (for example, 925a), and may adjust a position of the associated AR object (for example, 925a) according to a movement of the object (for example, 915a), based on the association information.

According to certain embodiments, the object recognition and tracking unit 640 may change a size of the associated AR object according to a changed size of the object. In an embodiment, when a size of a face appearing in the preview image is reduced by 20% from an original size of the face through tracking, the object recognition and tracking unit 640 may reduce the size of the associated AR object by 20%. In another embodiment, when a direction of the object is deflected from an original direction, the object recognition and tracking unit 640 may display the AR object to be seen as being deflected from an original direction, accordingly.

According to certain embodiments, the AR object drawn according to object-based drawing may have its display position determined based on not only a movement of the electronic device 101 but also a movement of the associated object.

According to certain embodiments, when the space-based drawing function is enabled, the space coordinate generation unit 650 may generate a world coordinate system with reference to the electronic device 101. In an embodiment, the space coordinate generation unit 650 may set a direction in which a camera currently photographs (forward, backward directions) to an X-direction, may set a direction (leftward, rightward directions) perpendicular to the X-direction to a Y-direction, and may set a direction (upward, downward directions) perpendicular to the plane formed by the X-direction and the Y-direction to a Z-direction. In addition, the space coordinate generation unit 650 may acquire coordinate values of feature points (point cloud) appearing in a preview of the camera, based on the set world coordinate system.

According to certain embodiments, the space-based drawing unit 660 may draw an AR object at specific coordinates, based on the world coordinate system. The space-based drawing unit 660 may set a position of the AR object at the time of initially drawing the AR object to a pre-set value. For example, the space-based drawing unit 660 may set a position of an initially drawn AR object to (X=−1, Y=0, Z=0). According to another embodiment, when the electronic device 101 does not move and a user inputs an AR object, the space-based drawing unit 660 may set a position of the center of the inputted AR object to (X=−1, Y=0, Z=0). In this case, a position of the electronic device 101 may be (X=0, Y=0, Z=0).

According to certain embodiments, the space-based drawing unit 660 may set a position and an orientation of the AR object drawn by the user, based on a movement of the electronic device 101 by the user and a drawing operation of the user. For example, when the user moves the electronic device 101 and draws the AR object at a position of (X=3, Y=2, Z=1) on the world coordinate system, the drawn AR object may be positioned at (X=2, Y=2, Z=1) on the world coordinate system. To support such a function, the space-based drawing unit 660 may acquire a position change and an orientation change of the electronic device 101 by using the six-degree-of-freedom detection module 230. The space-based drawing unit 660 may determine a position and an orientation of the AR object drawn by the user, by reflecting not only information of the changed position, but also information of the changed orientation from the six-degree-of-freedom detection module 230.

According to certain embodiments, the space-based drawing unit 660 may generate an AR object having a position changed based on simultaneous movement and drawing operation of the user, as shown in FIG. 5C. Herein, the drawing operation may be holding a touch on the same position of the screen of the electronic device 101. For example, the user may hold a touch on the screen until the electronic device 101 moving from a first position (for example, X=0, Y=0, Z=0) moves along a desired track and arrives at a second position (for example, X=1, Y=1, Z=0). In response to the above-described user operation, the space-based drawing unit 660 may set an AR object of a pipe shape connecting from the first position to the second position along the track where the electronic device 101 moves. According to an embodiment, the shape of the AR object connecting from the first position to the second position may be variously set, and one of the shapes already provided by the user may be selected. In the above-described embodiment, the track where the electronic device 101 moves may be acquired by the six-degree-of-freedom tracking and track extraction unit 670 by using the six-degree-of-freedom detection module 230.

According to certain embodiments, the space-based drawing unit 660 may fix the position of the inputted AR object to specific coordinates on the world coordinate system. According to an embodiment, the AR object may have various shapes passing through various coordinates on the world coordinate system, and in this case, the AR object may be fixed to the respective coordinates through which the AR object passes.

According to certain embodiments, the space-based drawing unit 660 may store the AR object generated by the user in the memory 240 along with parameters including coordinates on the world coordinate system to which the AR object is fixed. In addition, the space-based drawing unit 660 may record a video including a series of preview images shot by the camera module 220 and at least one AR object inserted into the series of preview images by the user, and may store the video in the memory 240.

According to certain embodiments, the space-based drawing unit 660 may read out an AR object stored in the memory 240, based on a user request, and may display the AR object on a current preview screen.

According to certain embodiments, the six-degree-of-freedom tracking and track extraction unit 670 may detect a movement of the electronic device 101 by using the six-degree-of-freedom detection module 230. The movement of the electronic device 101 may include a position movement and an orientation change. The six-degree-of-freedom tracking and track extraction unit 670 may track a movement of the electronic device 101 as shown in FIGS. 5A, 5B, 5C, 5D, and may provide the acquired information to the space-based drawing unit 660, such that a position and a shape of an AR object can be set.

According to certain embodiments, a position and/or a size of an AR object fixed to specific coordinates on the world coordinate system of the electronic device 101 may be changed, based on a movement of the electronic device 101 acquired by the six-degree-of-freedom tracking and track extraction unit 670. As shown in the embodiment of FIGS. 4A and 4B, when an AR object is positioned at coordinates (X=−1, Y=0, Z=0) on the world coordinate system, and the position of the electronic device 101 detected by the six-degree-of-freedom tracking and track extraction unit 670 is changed from (X=0, Y=0, Z=0) to (X=1, Y=0, Z=0), a distance between the AR object and the electronic device 101 may increase and thus the AR object displayed on the screen of the electronic device 101 may have its size reduced in proportion to the increasing distance. In another embodiment, when the AR object is positioned at coordinates (X=−1, Y=0, Z=0) on the world coordinate system and the position of the electronic device 101 detected by the six-degree-of-freedom tracking and track extraction unit 670 is gradually changed from (X=0, Y=0, Z=0) to (X=−1, Y=0, Z=0), a distance between the AR object and the electronic device 101 may be reduced and thus the AR object displayed on the screen of the electronic device 101 may have its size increase in proportion to the reduced distance. In still another embodiment, when a movement of the electronic device 101 detected by the six-degree-of-freedom tracking and track extraction unit 670 is rolling, the AR object displayed on the screen of the electronic device 101 may be rolled according to the rolling of the electronic device 101.

According to certain embodiments, when both the object-based drawing function and the space-based drawing function are enabled, the processor 210 may determine whether a user input is applied to the object-based drawing or the space-based drawing. According to an embodiment, the processor 210 may determine whether the user input is applied to the object-based drawing or the space-based drawing, based on a user selection input, for example, a selection input of selecting an icon indicating the object-based drawing or a selection input of selecting an icon indicating the space-based drawing. In another embodiment, the processor 210 may determine whether the object-based drawing function is applied or the space-based drawing function is applied, based on a starting position of the user input.

Figure 10:
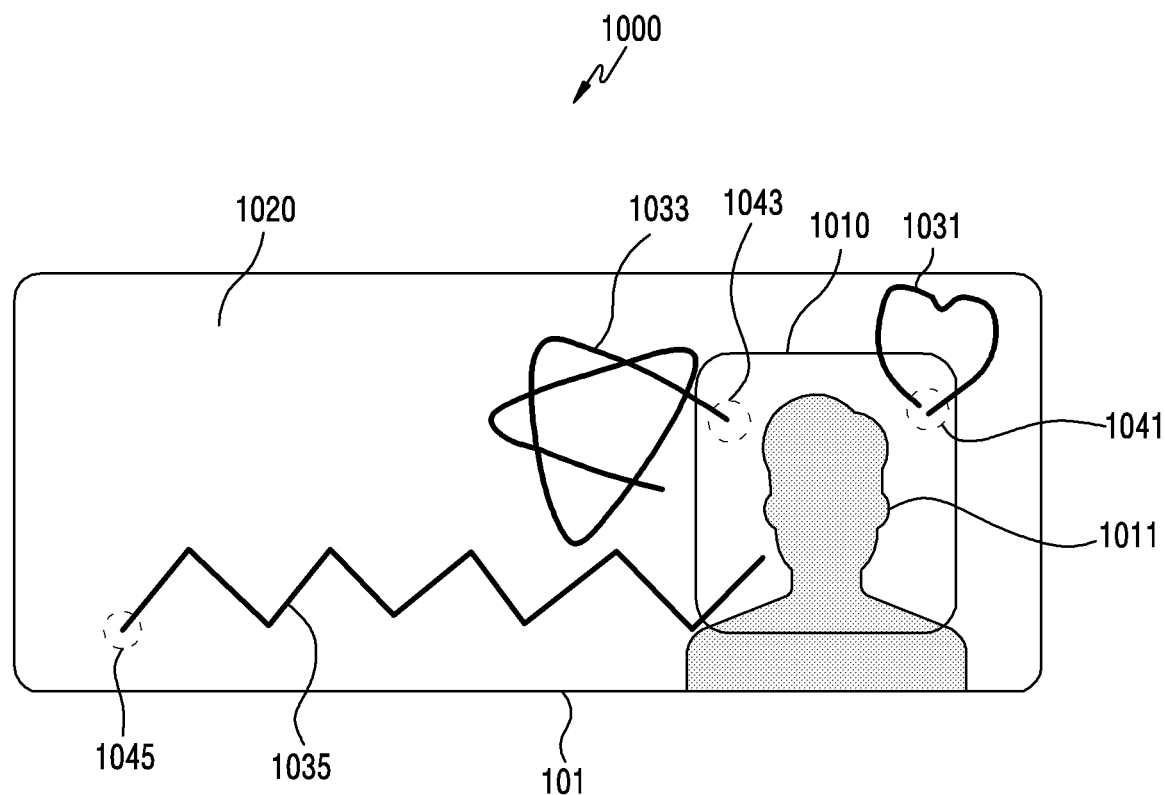
FIG. 10 is a view illustrating an example of generating an AR object by object-based drawing or space-based drawing according to certain embodiments.

FIG. 10 is a view 1000 illustrating an example of generating an AR object by object-based drawing or space-based drawing according to certain embodiments.

Referring to FIG. 10, the processor 210 may divide a preview image into an object area 1010 and a space area 1020. According to an embodiment, an object may be detected by the object detection unit 610 of the processor 210 and the object area 1010 may be set by the object area setting unit 620. According to an embodiment, the processor 210 may set the other area distinct from the object area 1010 in the preview image as the space area 1020.

According to certain embodiments, the processor 210 may determine whether an AR object inputted by the user is applied by object-based drawing or space-based drawing, based on a starting position of a user input. In an embodiment, when the AR object (for example, 1031, 1033) that is input by the user starts in the object area 1010 (for example, 1041, 1043) and is drawn, the processor 210 may apply object-based drawing to the corresponding AR object (for example, 1031, 1033), thereby associating the AR object with an object 1011 in the object area 1010. As the object-based drawing is applied, the processor 210 may determine information of the corresponding AR object 1031, 1033 based on the object 1011 in the object area 1010, and may store information of the AR object 1031, 1033 in association with the corresponding object 1011. In an embodiment, the processor 210 may indicate position information of the corresponding AR object 1031, 1033 as relative information based on the object 1011. Accordingly, the processor 210 may move the corresponding AR object 1031, 1033 or may change a size thereof, based on a movement of the object 1011 as depicted in the preview image, when displaying the corresponding AR object 1031, 1033 on the display device 250. In addition, when the corresponding object is detected in a preview image as shown in FIG. 9B, the processor 210 may display the AR object 1031, 1033 stored in association with the object on the screen.

According to certain embodiments, even when the AR object 1031, 1033 inputted by the user starts within the object area 1010 (for example, 1041, 1043) and is drawn, and is drawn to be extended to the space area outside the object area 1010, the processor 210 may apply the object-based drawing. All of the AR objects 1031, 1033 inputted by the user are not necessarily fully enclosed within the object area 1010, and according to an embodiment, when the starting position (for example, 1041, 1043) of the drawing is within the object area 1010, the processor 210 may draw the AR object by applying the object-based drawing, thereby anchoring the AR object to the object 1011.

According to certain embodiments, when an AR object 1035 inputted by the user starts within the space area 1020 (for example, 1045) and is drawn, the processor 210 may apply the space-based drawing to the corresponding AR object 1035. According to an embodiment, when the AR object 1035 inputted by the user starts within the space area 1020 (for example, 1045) and is drawn, but is extended to the object area 1010, the processor 210 may apply the space-based drawing. As the space-based drawing is applied, the processor 210 may fix the corresponding AR object 1035 to space coordinates on the world coordinate system set with reference to an initial position of the electronic device 101, and may change a size and a display position of the AR object, based on a movement of the electronic device 101.

According to certain embodiments, an electronic device (for example, the electronic device 101 of FIG. 1 or the electronic device 101 of FIG. 2) may include: at least one camera module (for example, the camera module 180 of FIG. 1, the camera module 220 of FIG. 2) configured to acquire a preview image; a display device (for example, the display device 160 of FIG. 1, the display device 250 of FIG. 2) configured to display the preview image and including a touch circuitry to acquire a user input; a six-degree-of-freedom detection module (for example, the six-degree-of-freedom detection module 230 of FIG. 2) configured to detect a movement of the electronic device; at least one processor (for example, the processor 120 of FIG. 1, the processor 120 of FIG. 2) operatively connected with the at least one camera module, the display device, and the six-degree-of-freedom detection module; and at least one memory (for example, the memory 130 of FIG. 1, the memory 240 of FIG. 2) operatively connected with the at least one processor. The at least one memory may store instructions that, when being executed, cause the at least one processor to: acquire a preview image by controlling the at least one camera module; set an object area and/or a space area in the preview image; display the preview image on the display device; acquire an input of a user based on the touch circuitry of the display device; determine whether object-based drawing is applied or space-based drawing is applied in response to the input of the user; and apply the object-based drawing or the space-based drawing to the input of the user based on the determining.

According to certain embodiments, the instructions may cause the at least one processor to: detect at least one object included in the preview image; set an object area regarding the at least one detected object; and set an area within the preview image other than the set object area as a space area.

According to certain embodiments, the instructions may cause the at least one processor to: when there is a face or a planar area where the user draws or writes a memo in the preview image, detect the corresponding face or the corresponding planar area as an object; or detect an area that is based on an input of the user by interaction with the user as an object.

According to certain embodiments, the instructions may cause the at least one processor to, when a face object is detected in the preview image, extract information of the face, to set a plurality of plates for the user to draw an AR object thereon, based on the extracted face information, and to set an object area based on the set plurality of plates.

According to certain embodiments, the instructions may cause the at least one processor to determine whether the object-based drawing is applied or the space-based drawing is applied in response to the input of the user, based on an object-based drawing selection input or a space-based drawing selection input of the user.

According to certain embodiments, the instructions may cause the at least one processor to determine whether the object-based drawing is applied or the space-based drawing is applied in response to the input of the user, based on whether a starting position of the input of the user is within the object area or the space area.

According to certain embodiments, to apply the object-based drawing, the instructions may cause the at least one processor to: detect an AR object input of the user; generate AR object information by associating the AR object inputted by the user with an object within the object area; and associate the generated AR object information with the object within the object area, and store the AR object information in the memory.

According to certain embodiments, the instructions may cause the at least one processor to: detect an object in the preview image; acquire AR object information associated with the detected object; display an AR object in association with the detected object, based on the acquired AR object information; and change display of the AR object based on a movement of the detected object.

According to certain embodiments, to apply the space-based drawing, the instructions may cause the at least one processor to: generate a world coordinate system based on a position of the electronic device; detect an AR object input of the user; determine coordinates of the AR object inputted by the user on the world coordinate system; and store AR object information including the determined coordinates on the world coordinate system in the memory.

According to certain embodiments, the instructions may cause the at least one processor to: display an AR object to which the space-based drawing is applied on the preview image; acquire movement information of the electronic device; and change display of the AR object based on the acquired movement of the electronic device.

According to certain embodiments, the electronic device 101 may allow a user to input an AR object in a preview image acquired by using the camera module 220. The electronic device 101 may change display of the inputted AR object, based on a movement of an object within the preview image or a movement of an object within the preview image associated with world coordinates of a space. Alternatively, the electronic device 101 may change the display of the inputted AR object, based on a movement of the electronic device 101 acquired by the six-degree-of-freedom detection module 230.

Hereinafter, operations of the electronic device 101 to perform the above-described functions will be described.

Figure 11:
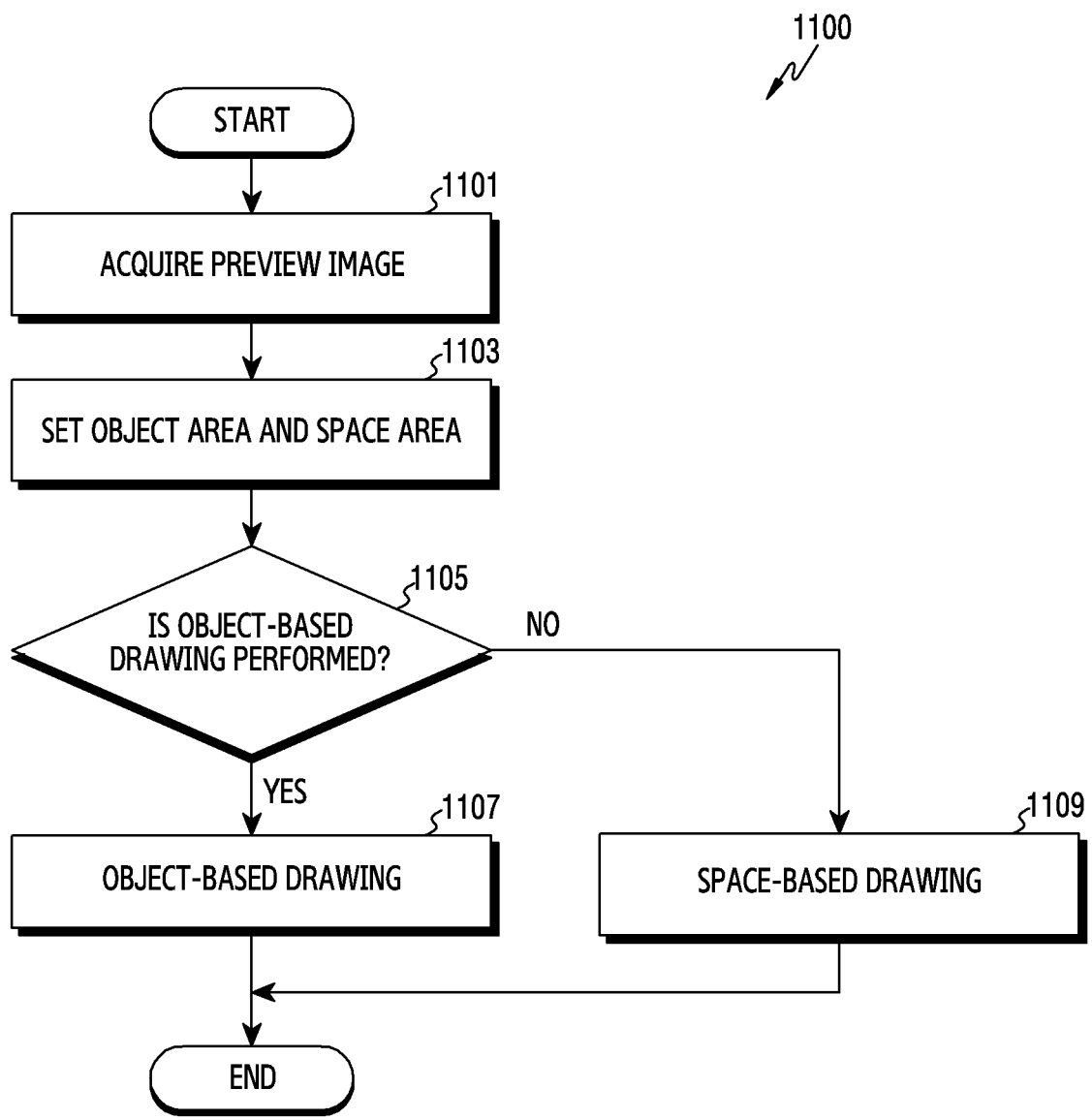
FIG. 11 is a flowchart of an operation of generating an AR object in an electronic device according to certain embodiments.

FIG. 11 is a flowchart 1100 of an operation of generating an AR object in the electronic device 101 according to certain embodiments. An operating entity of the flowchart 1100 illustrated in FIG. 11 may be understood as an electronic device (for example, the electronic device 101 of FIG. 1 or the electronic device 101 of FIG. 2, or a processor of the electronic (for example, the processor 120 of FIG. 1 or the processor 120 of FIG. 2)).

According to certain embodiments, in operation 1101, the electronic device 101 may acquire a preview image through the camera module 220. The preview image may be a still image or a video.

According to various embodiment, in operation 1103, the electronic device 101 may set an object area and a space area. The object area may be an area enclosing a specific object depicted within the preview image. Objects drawn within the object area may be associated with the object and have their movements anchored to movement of the object. The space area may be set to the other areas except for the object area within the preview image. When there is no object area in the preview image, the electronic device 101 may set all areas of the preview image to the space area. According to certain embodiments, when a plurality of objects are detected in the preview image, the electronic device 101 may set separate object areas for the respective objects.

According to certain embodiments, in operation 1105, the electronic device 101 may determine whether object-based drawing is applied or space-based drawing is applied with respect to AR object drawing of a user. In an embodiment, the electronic device 101 may apply object-based drawing or space-based drawing to AR object drawing of the user afterward, based on a user input of selecting object-based drawing or a user input of selecting space-based drawing. In another embodiment, the electronic device 101 may determine whether object-based drawing is applied or space-based drawing is applied, based on a starting position or an end position of AR object drawing of the user. For example, when the starting position or end position of AR object drawing of the user is within the object area, the electronic device 101 may apply object-based drawing, and, when the starting position or end position is within the space area, the electronic device 101 may apply space-based drawing.

According to certain embodiments, when the electronic device determines to apply object-based drawing in operation 1105 (1105—Yes), the electronic device 101 may apply object-based drawing in operation 1107, and may generate an AR object according to a user input. When the electronic device 101 determines to apply space-based drawing in operation 1105 (1105—No), the electronic device 101 may apply space-based drawing in operation 1109 and may generate an AR object according to a user input.

Figure 12:
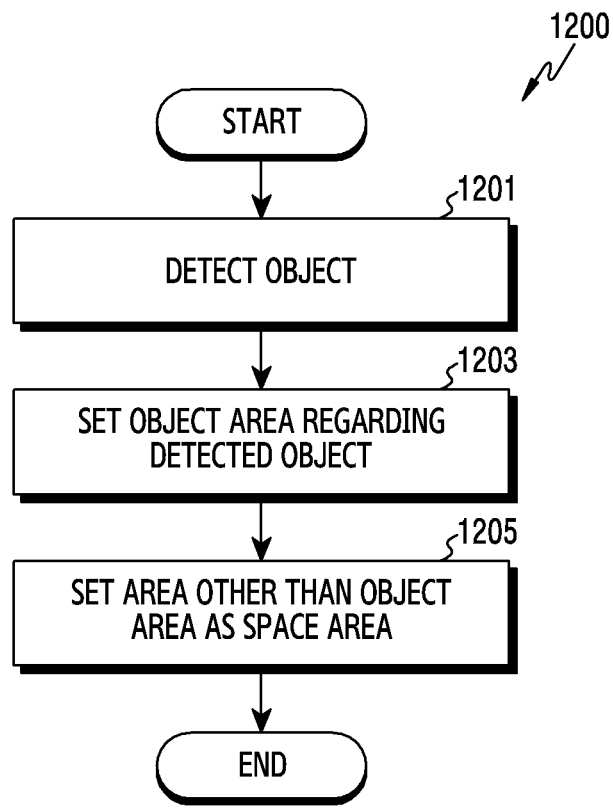
FIG. 12 is a flowchart of an operation of setting an object area and a space area in an electronic device according to certain embodiments.

FIG. 12 is a flowchart 1200 illustrating an operation of setting an object area and a space area in the electronic device 101 according to certain embodiments. An operating entity of the flowchart 1200 illustrated in FIG. 12 may be understood as an electronic device (for example, the electronic device 101 of FIG. 1 or the electronic device 101 of FIG. 2, or a processor of the electronic device (for example, the processor 120 of FIG. 1 or the processor 210 of FIG. 2)). The flowchart 1200 illustrated in FIG. 12 may be an embodiment of operation 1103 of FIG. 11.

According to certain embodiments, in operation 1201, the electronic device 101 may detect an object depicted in a preview image. In an embodiment, the detected object may be a person's face. In another embodiment, the detected object may be a planar area where the user can draw or a planar area where a memo can be written. According to an embodiment, the electronic device 101 may detect a plurality of objects.

According to certain embodiments, in operation 1203, the electronic device 101 may set an object area based on the detected object. In an embodiment, when the detected object is a person's face, the electronic device 101 may set an area that enclosed the detected face and is slightly larger than the face. According to an embodiment, the electronic device 101 may set the object area to have the same shape as the outline of the face. According to another embodiment, the electronic device 101 may set a rectangular or square shape including the detected face as the object area. In still another embodiment, when the detected object is a planar area where the user can draw or a planar area where a memo can be written, the electronic device 101 may set the detected planar area as the object area. According to an embodiment, the electronic device 101 may set the object area differently according to a position, a direction and/or a size of the detected object. In another embodiment, when the electronic device 101 does not detect the object within the preview image, the electronic device 101 may receive an input of a specific area or a specific position through interaction with the user, and may set the corresponding specific area as the object area. Alternatively, the electronic device 101 may set a circle having a predetermined radius with reference to the specific position, or a rectangular area having a constant distance to vertexes from the specific position as the object area.

According to certain embodiments, when the electronic device 101 detects a plurality of objects, the electronic device 101 may set different object areas for the respective objects.

According to certain embodiments, in operation 1205, the electronic device 101 may set the other area except for the object area set in the preview image as the space area.

Figure 13:
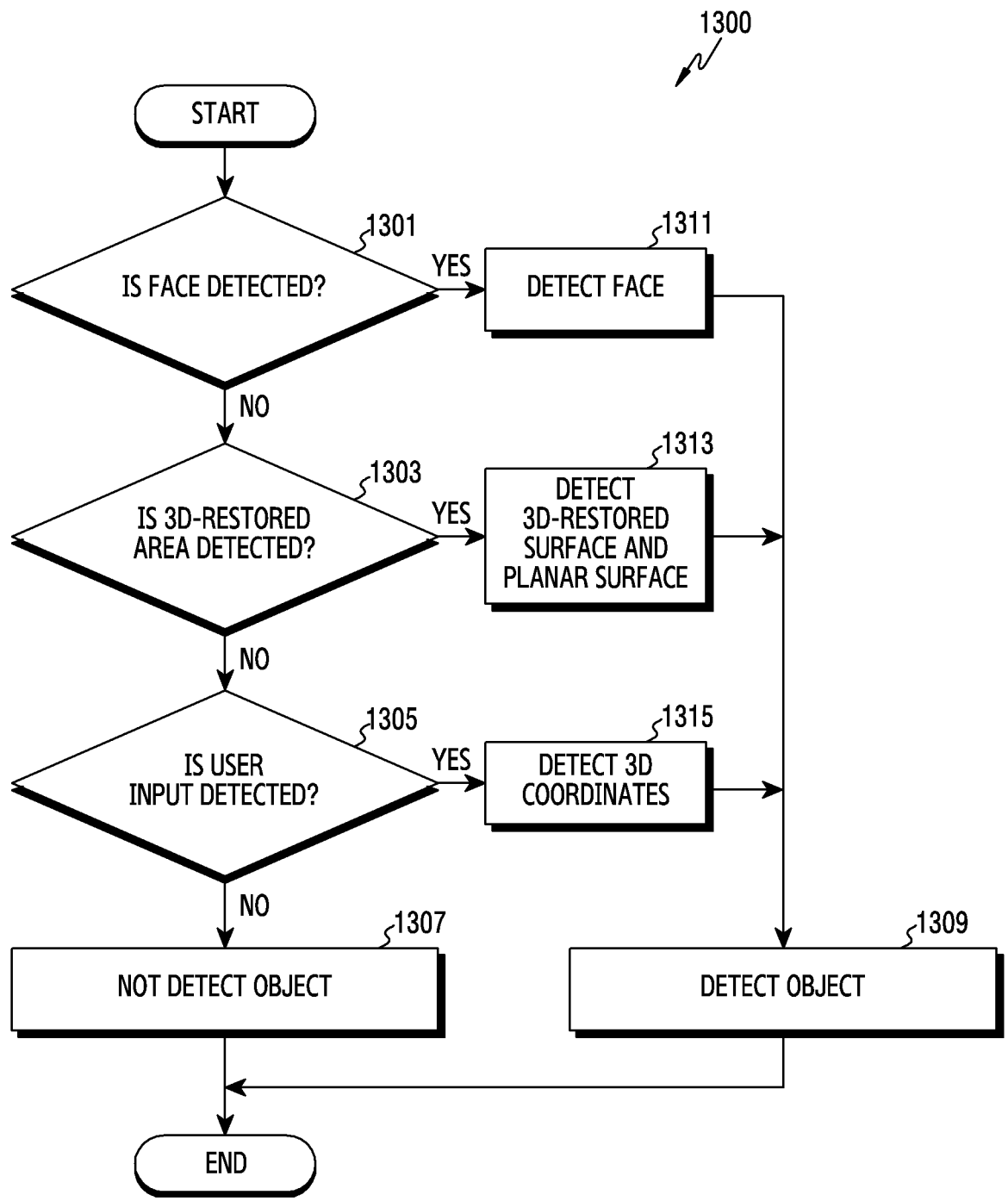
FIG. 13 is a flowchart illustrating an operation of detecting an object in an electronic device according to certain embodiments.

FIG. 13 is a flowchart 1300 illustrating an operation of detecting an object in the electronic device 101 according to certain embodiments. An operating entity of the flowchart 1300 illustrated in FIG. 13 may be understood as an electronic device (for example, the electronic device 101 of FIG. 1 or the electronic device 101 of FIG. 2, or a processor of the electronic device (for example, the processor 120 of FIG. 1 or the processor 210 of FIG. 2). The flowchart 1300 of FIG. 13 may be an embodiment of operation 1201 of FIG. 12.

According to certain embodiments, in operation 1301, the electronic device 101 may determine whether a person's face is detected in a preview image. When the face is detected as a result of determining (1301—Yes), the electronic device 101 may set a parameter indicating that the face is detected in operation 1311, and may set that the object is detected in operation 1309.

According to certain embodiments, when the face is not detected in operation 1301 (1301—No), the electronic device 101 may perform 3D restoration from the preview image, and may determine whether 3D-restored surface information and a planar surface where the user can draw or write a memo are detected from the 3D restoration information in operation 1303. When the 3D-restored surface information and the planar surface are detected as a result of determining (1303—Yes), the electronic device 101 may set a parameter indicating that the 3D-restored surface information and the planar surface are detected in operation 1313, and may set that the object is detected in operation 1309.

According to certain embodiments, when the 3D-restored surface information and the planar surface are not detected as a result of determining in operation 1303 (1303—No), the electronic device 101 may determine whether there exists a user input for setting an object in the preview image in operation 1305. The user input may be touching an object within the preview image that is not recognized as the object by the electronic device 101. In another embodiment, the user input may be touching a specific planar area within the preview image, for example, a top surface of a desk which is 3D-restored. When the user input is detected as a result of determining (1305—Yes), the electronic device 101 may acquire 3D coordinates of a position where the user input is detected in operation 1315, may set an object or a planar area on the obtained 3D coordinates as an object, and may set that the object is detected in operation 1309.

According to certain embodiments, when the user input for setting the object area is not detected as a result of determining in operation 1305 (1305—No), the electronic device may set that the object is not detected in operation 1307.

Figure 14:
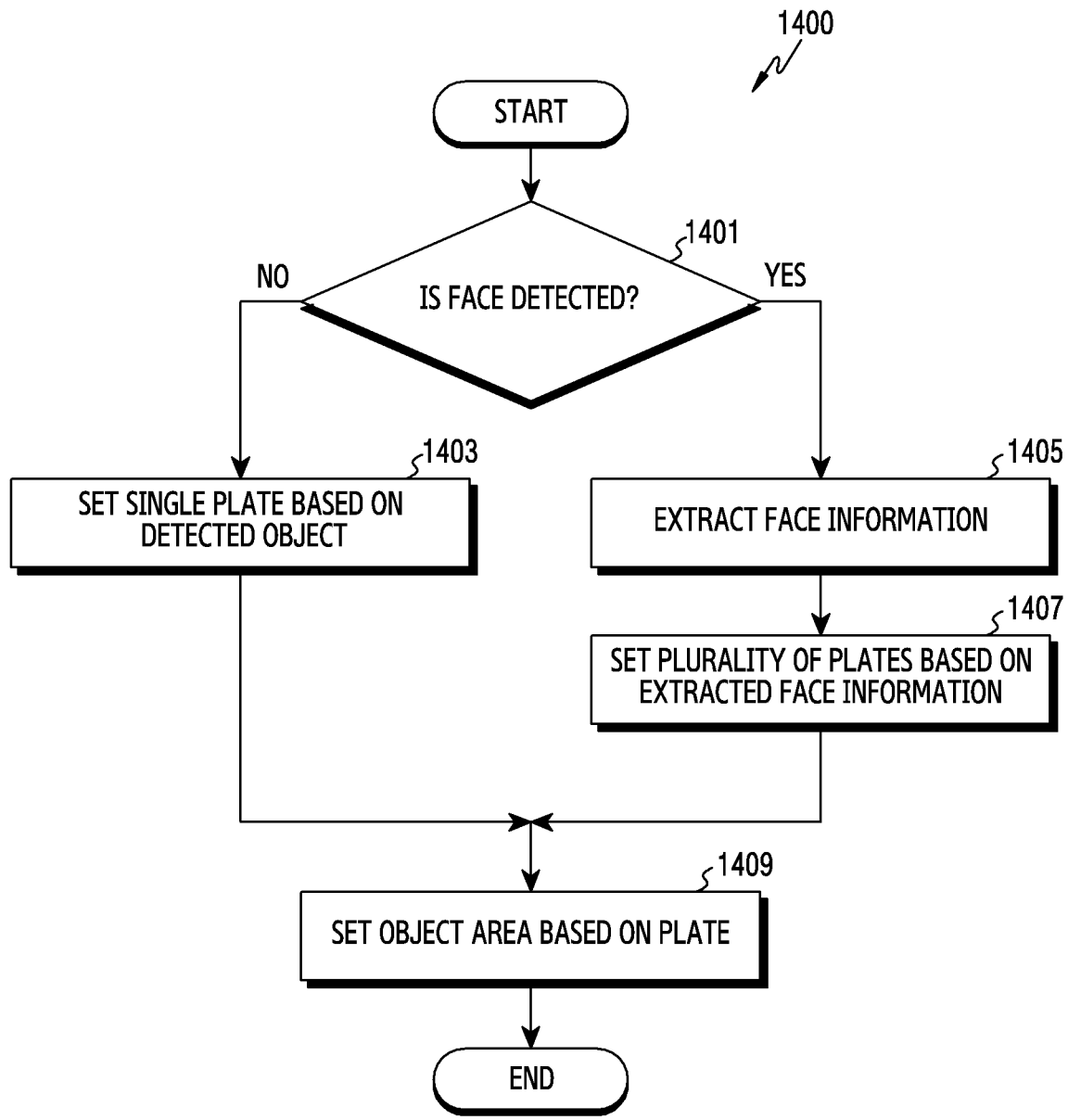
FIG. 14 is a flowchart illustrating an operation of setting an object area in an electronic device according to certain embodiments.

FIG. 14 is a flowchart 1400 illustrating an operation of setting an object area in the electronic device 101 according to certain embodiments. An operating entity of the flowchart 1400 illustrated in FIG. 14 may be understood as an electronic device (for example, the electronic device 101 of FIG. 1 or the electronic deice 101 of FIG. 2 or a processor of the electronic device (for example, the processor 120 of FIG. 1 or the processor 210 of FIG. 2)). The flowchart 1400 illustrated in FIG. 14 may be an embodiment of operation 1203 of FIG. 12.

According to certain embodiments, in operation 1401, the electronic device 101 may determine whether a person's face is detected in a preview image. Determining in operation 1401 may be based on a parameter which is set by a result of detecting illustrated in FIG. 13.

According to certain embodiments, when a face is detected as a result of determining in operation 1401 (1401—Yes), the electronic device 101 may acquire information regarding the face in operation 1405. In an embodiment, the electronic device 101 may extract feature points from the face, and may acquire depth information at each feature point. In addition, the electronic device 101 may acquire size, color information of the face.

According to certain embodiments, in operation 1407, the electronic device 101 may generate a plurality of plates on which the user can draw an AR object, based on the acquired face information. In an embodiment, the electronic device 101 may identify feature portions having different features, such as eyes, cheeks, lips, ears, based on the acquired face information, and may provide plates regarding the identified different feature portions to allow the user to effectively draw thereon. In an embodiment, the electronic device 101 may provide the plate 871a which slopes by about 1-2 degrees from the center of cheekbone at the angle of the curved surface of the check, based on the acquired face information, in order for the user to effectively draw mustache. In another embodiment, the electronic device 101 may provide the plate 871b according to curved surfaces of the lips to allow the user to effectively draw like coloring the lips on the periphery of the lips. In still another embodiment, the electronic device 101 may provide the plate 871c slightly floating above the face on the periphery of the eyes to allow the user to effectively draw eyeglasses on the periphery of the eyes.

According to certain embodiments, when the face is not detected as a result of determining in operation 1401 (1401—No), the electronic device 101 may set a single plate based on detected planar surface information or object information in operation 1403.

According to certain embodiments, the electronic device 101 may set an object area in operation 1409, based on the plurality of plates set in operation 1407 or the single plate set in operation 1403.

Figure 15:
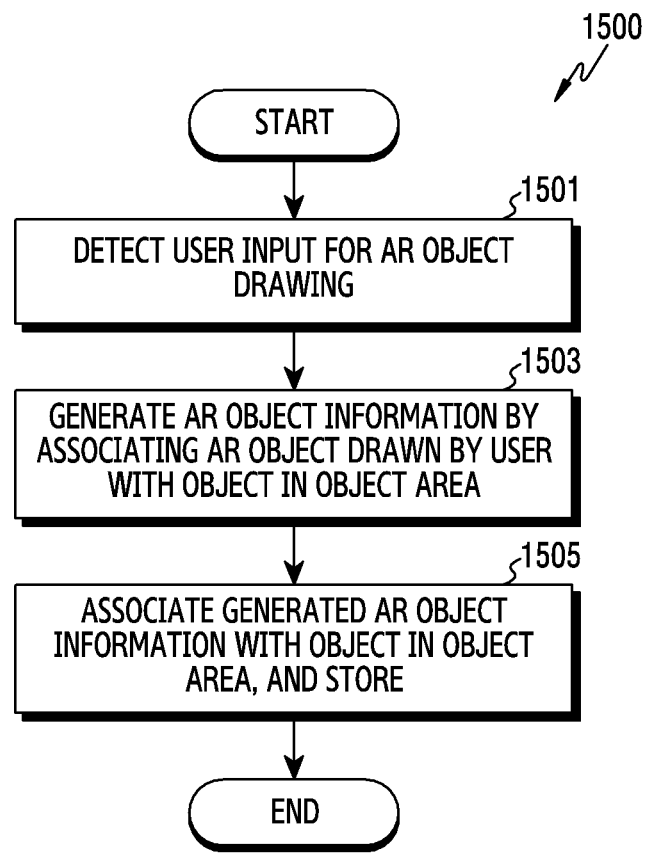
FIG. 15 is a flowchart illustrating an object-based drawing operation in an electronic device according to certain embodiments.

FIG. 15 is a flowchart 1500 illustrating an object-based drawing operation in the electronic device 101 according to certain embodiments. An operating entity of the flowchart 1500 illustrated in FIG. 15 may be understood as an electronic device (for example, the electronic device 101 of FIG. 1 or the electronic deice 101 of FIG. 2 or a processor of the electronic device (for example, the processor 120 of FIG. 1 or the processor 210 of FIG. 2)). The flowchart 1500 illustrated in FIG. 145 may be an embodiment of operation 1107 of FIG. 11.

According to certain embodiments, in operation 1501, the electronic device 101 may detect a user input for AR object drawing. According to an embodiment, the user input may be directly drawing an AR object. In another embodiment, the user input may be selecting any one of AR objects pre-stored in the electronic device 101. In this case, the electronic device 101 may display a plurality of AR objects pre-stored therein on the display device 250. The electronic device 101 may display an AR object selected by the user on the display device 250 along with a preview image, based on the user input of selecting one of the displayed plurality of AR objects. In addition, the electronic device 101 may detect a user input of designating a position of the AR object displayed on the display device 250, and may place the corresponding AR object at the position designated by the user.

According to certain embodiments, in operation 1503, the electronic device 101 may generate AR object information by associating the AR object drawn by the user or the AR object selected and positioned by the user with an object in an object area. In an embodiment, the AR object information may include a relative position of the AR object with reference to the object in the object area, a shape of the AR object. Accordingly, the electronic device 101 may generate relative position information of the AR object including relative distance and direction information between the center point of the object within the object area and the AR object, based on user's AR object drawing. In addition, the electronic device 101 may generate shape information of the AR object drawn by the user. The shape information of the AR object may be shown in a bitmap format, a JPEG format, or a GIF format.

According to certain embodiments, in operation 1505, the electronic device 101 may associate the generated AR object information with the object within the object area, and may store the AR object information in the memory 240. The stored AR object information may be used afterward.

Figure 16:
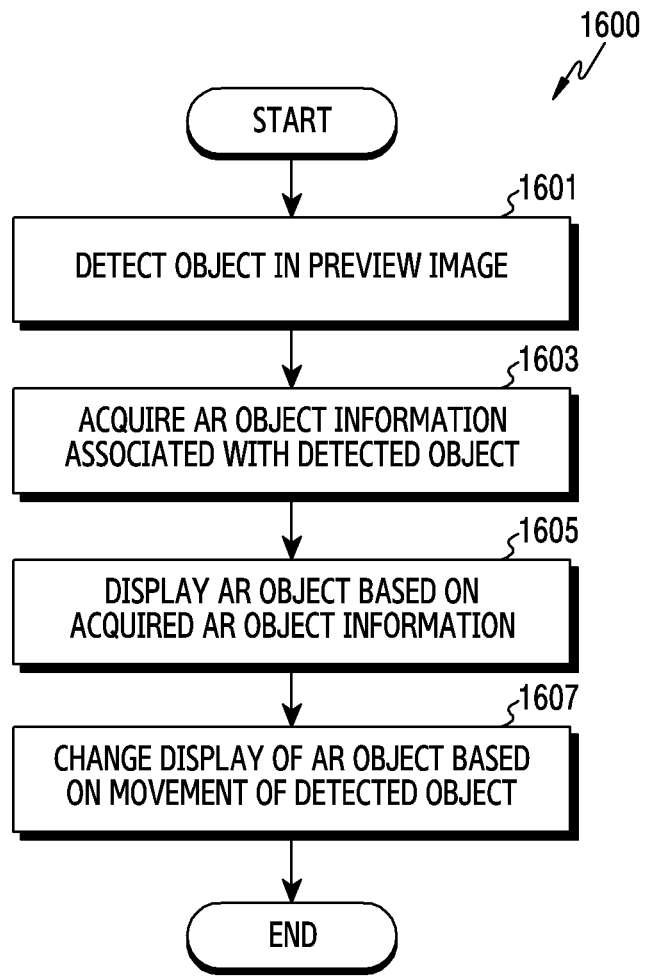
FIG. 16 is a flowchart illustrating an operation of displaying an AR object which is drawn based on an object in an electronic device according to certain embodiments.

FIG. 16 is a flowchart 1600 illustrating an operation of displaying an object-based drawn AR object in the electronic device 101 according to certain embodiments. An operating entity of the flowchart 1600 illustrated in FIG. 16 may be understood as an electronic device (for example, the electronic device 101 of FIG. 1 or the electronic device 101 of FIG. 2, or a processor of the electronic device (for example, the processor 120 of FIG. 1 or the processor 210 of FIG. 2)).

According to certain embodiments, in operation 1601, the electronic device 101 may detect an object from a preview image acquired by the camera module 220.

According to certain embodiments, in operation 1603, the electronic device 101 may acquire AR object information associated with the detected object from the memory 240.

According to an embodiment, the electronic device 101 may associate feature information of an object with an AR object generated according to the flowchart of FIG. 15 based on the corresponding object, and may store the associated information in the memory 240. The electronic device 101 may compare feature information of the object detected in operation 1601 and feature information of the object stored in the memory, and may acquire feature information of the object that is determined as being equal to the information stored in the memory, and may acquire AR object information stored in association with the corresponding feature information.

According to certain embodiments, in operation 1605, the electronic device 101 may display an AR object in association with the object appearing in the preview image, based on the acquired AR object information. Since the AR object information includes information regarding a relative distance and a direction to the center point of the corresponding object, and shape information, the electronic device 101 may determine a position of the AR object based on the object appearing in the preview, based on the AR object information, and may display the AR object.

According to certain embodiments, in operation 1607, the electronic device 101 may change the display of the associated AR object, based on a movement of the detected object. According to an embodiment, since the AR object generated by object-based drawing determines its position and/or direction in association with the corresponding object, a display position, a display direction and/or a size of the AR object may be changed based on a movement of the corresponding object. When a display position of the corresponding object displayed on the screen is changed by a movement of the electronic device 101, the electronic device 101 may change the display position of the AR object based on the position change of the corresponding object.

Figure 17:
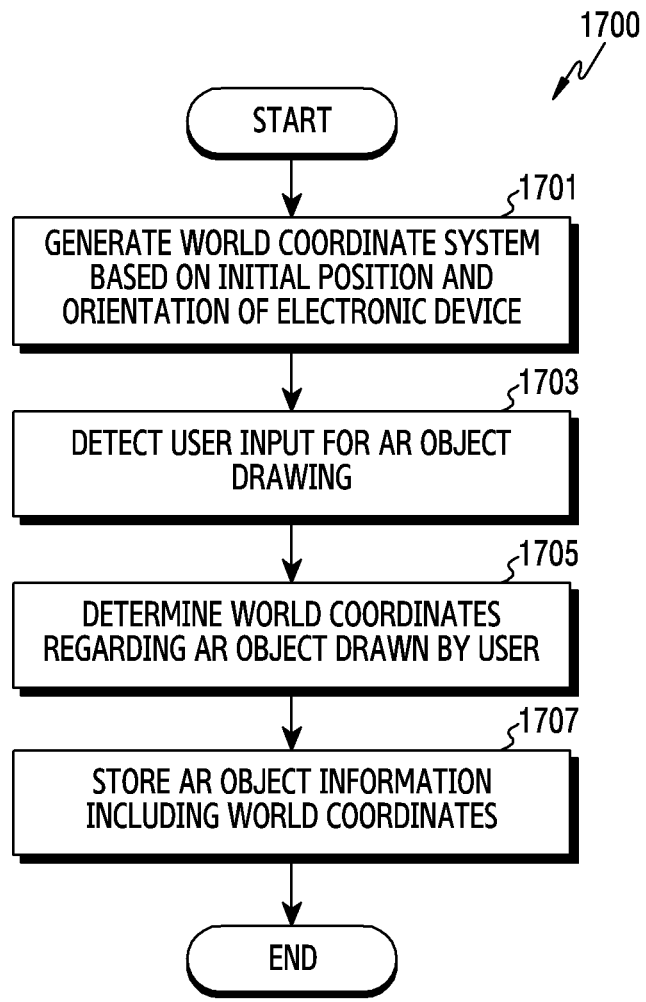
FIG. 17 is a flowchart illustrating a space-based drawing operation in an electronic device according to certain embodiments.

FIG. 17 is a flowchart 1700 illustrating a space-based drawing operation in the electronic device 101 according to certain embodiments. An operating entity of the flowchart 1700 illustrated in FIG. 17 may be understood as an electronic device (for example, the electronic device 101 of FIG. 1 or the electronic device 101 of FIG. 2, or a processor of the electronic device (for example, the processor 120 of FIG. 1 or the processor 210 of FIG. 2)). The flowchart 1700 illustrated in FIG. 17 may be an embodiment of operation 1109 of FIG. 11.

According to certain embodiments, in operation 1701, the electronic device 101 may generate a world coordinate system. A reference of the world coordinate system may be an initial position and orientation of the electronic device 101. In an embodiment, the initial position of the electronic device 101 may be a position of the electronic device 101 at a time when a related application is executed by the processor 210. In another embodiment, the initial position of the electronic device 101 may be a position of the electronic device 101 at a time when an AR object is drawn according to initial space-based drawing after the related application is executed by the processor 210.

According to certain embodiments, in operation 1703, the electronic device 101 may detect a user input for drawing an AR object.

According to certain embodiments, in operation 1705, the electronic device 101 may determine coordinates of the AR object drawn by the user on the world coordinate system. According to an embodiment, a position and an orientation of the AR object generated by initial space-based drawing after the application is executed by the processor 210 may be a pre-set position and orientation. In an embodiment, when the position of the electronic device 101 which is a reference of the world coordinate system is (X=0, Y=0, Z=0) and all of yaw, pitch, and roll are 0 degree, a position of an initially drawn AR object may be (X=−1, Y=0, Z=0) and all of yaw, pitch, and roll of the AR object may be 0 degree. According to an embodiment, a position and an orientation of a second or higher order AR object drawn may be determined based on a position and an orientation of the electronic device 101. In an embodiment, a position of an AR object drawn after the position of the electronic device 101 is changed to (X=2, Y=1, Z=0) may be (X=1, Y=1, Z=0). Accordingly, the position of the AR object may be a vector added to (X=−1, Y=0, Z=0) as much as a displacement of the position of the electronic device 101.

According to certain embodiments, in operation 1707, the electronic device 101 may store AR object information including the world coordinates in the memory 240. The stored AR object information may be used afterward.

Figure 18:
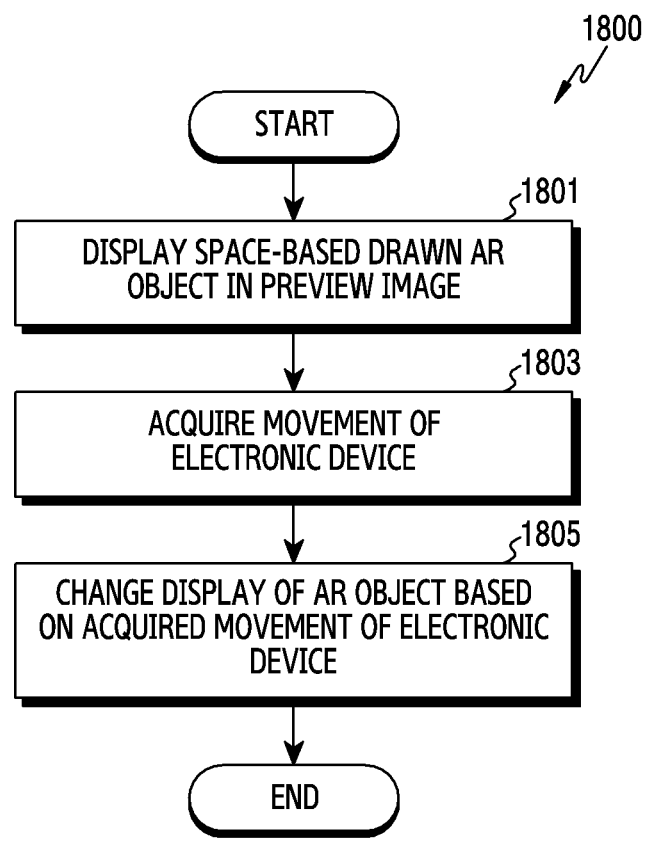
FIG. 18 is a flowchart illustrating an operation of displaying an AR object which is drawn based on a space in an electronic device according to certain embodiments.

FIG. 18 is a flowchart 1800 illustrating an operation of displaying a space-based drawn AR object in the electronic device 101 according to certain embodiments. An operating entity of the flowchart 1800 illustrated in FIG. 18 may be understood as an electronic device (for example, the electronic device 101 of FIG. 1 or the electronic device 101 of FIG. 2, or a processor of the electronic device (for example, the processor 120 of FIG. 1 or the processor 210 of FIG. 2)).

According to certain embodiments, in operation 1801, the electronic device 101 may display an AR object drawn based on a space on the display device 250, along with a preview image acquired by the camera module 220. In an embodiment, the electronic device 101 may display the AR object drawn based on the flowchart 1700 of FIG. 17 on the display device 250. In another embodiment, the electronic device 101 may select a space-based drawn AR object which is displayed by default when an application is executed, and may display the AR object. In still another embodiment, the electronic device 101 may display a space-based drawn AR object which is selected by a user input on the display device 250. In this case, the electronic device 101 may show the space-based drawn AR object stored in the memory 240 to the user by displaying the AR object on the display device 250, and may allow the user to select at least one of the displayed AR objects. In an embodiment, the space-based drawn AR object which is stored in the memory 240 may be the AR object generated in the electronic device 101 according to the flowchart 1700 of FIG. 17. In another embodiment, a space-based drawn AR object which is generated in another electronic device 102 may be received through various communication means, and may be stored in the memory 240.

According to certain embodiments, in operation 1803, the electronic device 101 may acquire movement information thereof. In an embodiment, the electronic device 101 may acquire a position change and an orientation change of the electronic device 101 by using the six-degree-of-freedom detection module.

According to certain embodiments, in operation 1805, the electronic device 101 may change the display of the AR object based on the acquired movement of the electronic device 101. According to an embodiment, when the movement of the electronic device 101 is gradually getting closer to coordinates of the AR object on the world coordinate system, the electronic device 101 may gradually increase the size of the AR object, and may display the enlarged AR object. According to another embodiment, when the movement of the electronic device 101 is gradually getting further away from the coordinates of the AR object on the world coordinate system, the electronic device 101 may gradually reduce the size of the AR object and may display the reduced AR object. According to still another embodiment, when the movement of the electronic device 101 is turning to the left while maintaining a distance to the AR object on the world coordinate system, the electronic device 101 may display to turn the AR object to the right while maintaining the size of the AR object.

Both the AR object to which the object-based drawing is applied and the AR object to which the space-based drawing is applied, which are generated by the above-described method, may be displayed. The display of the AR object to which the object-based drawing is applied may be changed based on a movement of the associated object. The AR object to which the space-based drawing is applied may be fixed to coordinates on the world coordinate system, and the display of the AR object may be changed based on a movement of the electronic device 101.

According to certain embodiments, an operating method of an electronic device (for example, the electronic device 101 of FIG. 1 or the electronic device 101 of FIG. 2) may include: acquiring a preview image by using at least one camera module (for example, the camera module 180 of FIG. 1, the camera module 220 of FIG. 2); setting an object area and/or a space area in the preview image; displaying the preview image on a display device; determining whether object-based drawing is applied or space-based drawing is applied in response to an input of a user using the display device; and applying the object-based drawing or the space-based drawing to an AR object input of the user based on the determining.

According to certain embodiments, setting the object area/or the space area in the preview image may include: detecting at least one object included in the preview image; setting an object area regarding the at least one detected object; and setting an area within the preview image other than the set object area as a space area.

According to certain embodiments, detecting the at least one object may include at least one of: when there is a face or a planar area where the user draws or writes a memo in the preview image, detecting the corresponding face or the corresponding planar area as an object; and detecting an area that is based on an input of the user by interaction with the user as an object.

According to certain embodiments, when a face object is detected in the preview image, setting the object area may include: extracting information of the face; setting a plurality of plates for the user to draw an AR object thereon, based on the extracted face information; and setting an object area based on the set plurality of plates.

According to certain embodiments, determining may include determining whether the object-based drawing is applied or the space-based drawing is applied in response to the AR object input of the user, based on an object-based drawing selection input or a space-based drawing selection input of the user.

According to certain embodiments, determining may include determining whether the object-based drawing is applied or the space-based drawing is applied in response to the AR object input of the user, based on whether a starting position of the AR object input of the user is within the object area or the space area.

According to certain embodiments, applying the object-based drawing may include: detecting an AR object input of the user; generating AR object information by associating the AR object inputted by the user with an object within the object area; and associating the generated AR object information with the object within the object area, and storing the AR object information in a memory.

According to certain embodiments, the method may include: detecting an object in the preview image; acquiring AR object information associated with the detected object; displaying an AR object in association with the detected object, based on the acquired AR object information; and changing display of the AR object based on a movement of the detected object.

According to certain embodiments, applying the space-based drawing may include: generating a world coordinate system based on a position of the electronic device; detecting an AR object input of the user; determining coordinates of the AR object inputted by the user on the world coordinate system; and storing AR object information including the determined coordinates on the world coordinate system in the memory.

According to certain embodiments, the method may include: displaying an AR object to which the space-based drawing is applied on the preview image; acquiring movement information of the electronic device; and changing display of the AR object based on the acquired movement of the electronic device.

According to certain embodiments described above, the present disclosure may allow a user to draw various AR objects desired by the user on a preview screen and to attach the AR objects, such that an enhanced sense of immersion and a fun factor can be provided to the user.

In addition, the present disclosure may provide both object-based drawing and space-based drawing and may provide a function of inserting various AR objects desired by a user.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   at least one camera configured to capture images;
   a display including a touch input circuitry;
   a motion sensor configured to detect a movement of the electronic device in at least six-degrees-of-freedom;
   at least one processor operatively connected with the at least one camera, the display, and the motion sensor; and
   at least one memory operatively connected with the at least one processor,
   wherein the at least one memory stores instructions that, when executed, cause the at least one processor to:
   acquire a preview image captured by the at least one camera;
   set an augmented reality (AR) object area and/or a space area in the preview image;
   display the acquired preview image on the display;
   detect an input to add an AR object to the display using the touch input circuitry;
   determine whether the detected input requests application of an object-based drawing in which the AR object is arranged in AR space relative to an object in the preview image, or a space-based drawing in which the AR object is arranged in the AR space relative to a real-world position in the AR space; and
   apply the object-based drawing or the space-based drawing to the acquired preview image according to the determination as to whether the detected input requests application of the object-based drawing or the space-based drawing.

2. The electronic device of claim 1, wherein the instructions cause the at least one processor to:
   detect at least one object included in the preview image;
   set an object area that corresponds to the detected at least one object; and
   set another area within the preview image different than the set object area as a space area.

3. The electronic device of claim 2, wherein the instructions cause the at least one processor to:
   when a face or a planar surface is depicted in a region of the preview image where a drawing or memo is input to the preview image, detect the face or the planar surface depicted in the region as an object; or
   detect a second input identifying a user-designated area as an object.

4. The electronic device of claim 3, wherein the instructions cause the at least one processor to:
   when the face is detected in the preview image, set the face as a face object;
   extract information related to the face from the preview image;
   generate a plurality of plates each corresponding to a particular feature of the face based on the extracted face information, wherein each plate defines an area within the preview image on which AR objects are drawable; and
   set an object area based on the generated plurality of plates.

5. The electronic device of claim 1, wherein the instructions cause the at least one processor to:
   determine whether the object-based drawing or the space-based drawing is applied based on detecting one of an object-based drawing selection input and a space-based drawing selection input.

6. The electronic device of claim 1, wherein the object area frames an object included in the acquired preview image in the AR space, and the space area includes a display area of the display excluding the object area,
wherein the instructions cause the at least one processor to:
determine whether the object-based drawing or the space-based drawing is applied based on whether a starting position of the input is within the object area or the space area.

7. The electronic device of claim 1, wherein applying the object-based drawing further comprises:
detecting an input of an AR object;
generating AR object information for the AR object by associating the AR object with an object depicted within the object area; and
associating the generated AR object information with the depicted object, and storing the AR object information in the memory.

8. The electronic device of claim 1, wherein the instructions cause the at least one processor to:
detect an object in the preview image;
acquire AR object information associated with the detected object;
display an AR object in association with the detected object, based on the acquired AR object information; and
change display of the AR object based on detecting movement of the detected object.

9. The electronic device of claim 1, wherein, applying the space-based drawing further comprises:
generating a world coordinate system according to a position of the electronic device;
detecting an AR object input;
determining coordinates of the AR object with respected to the generated world coordinate system; and
storing AR object information including the determined coordinates in the memory.

10. The electronic device of claim 1, wherein the instructions cause the at least one processor to:
display an AR object to which the space-based drawing is applied on the preview image;
detect a movement of the electronic device by the motion sensor; and
change display of the AR object based on the detected movement of the electronic device.

11. An operating method of an electronic device, the method comprising:
acquiring a preview image using a camera module;
setting, by a processor, an augmented reality (AR) object area and/or a space area in the preview image;
displaying the preview image on a display;
in response to detecting an input to the display via touch circuitry, determining whether to add an AR object using object-based drawing in which the AR object is arranged in AR space relative to an object in the preview image, or space-based drawing in which the AR object is arranged in the AR space relative to a real-world position in the AR space;
receiving an input of the AR object to the preview image; and
applying the AR object to the preview image according to the object-based drawing or the space-based drawing according to the determination as to whether the detected input requests application of the object-based drawing or the space-based drawing.

12. The method of claim 11, wherein setting the object area/or the space area in the preview image comprises:
detecting at least one object depicted in the preview image;
setting an object area corresponding to the at least one detected object; and
setting an area within the preview image different than the set object area as a space area.

13. The method of claim 12, wherein detecting the at least one object comprises at least one of:
when a face or a planar surface is depicted in a region of the preview image where a drawing or memo is input to the preview image, detecting the face or the planar surface depicted in the region as an object; or
detecting a second input identifying a user-designated area as an object.

14. The method of claim 13, wherein, when the face is detected in the preview image as the object, setting the object area comprises:
extracting information related to the face from the preview image;
generating a plurality of plates each corresponding to a particular feature of the face based on the extracted face information, wherein each plate defines an area within the preview image on which AR objects are drawable; and
setting an object area based on the generated plurality of plates.

15. The method of claim 11, wherein determining whether the object-based drawing or the space-based drawing is applied is based on detecting one of an object-based drawing selection input and a space-based drawing selection input.

16. The method of claim 11, wherein the object area frames an object included in the acquired preview image in the AR space, and the space area includes a display area of the display excluding the object area, and
wherein determining whether the object-based drawing or the space-based drawing is applied is based on whether a starting position of the input is within the object area or the space area.

17. The method of claim 11, wherein applying the object-based drawing further comprises:
detecting an input of an AR object;
generating AR object information for the AR object by associating the AR object with an object depicted within the object area; and
associating the generated AR object information with the depicted object, and storing the AR object information in a memory.

18. The method of claim 11, wherein the method comprises:
detecting an object in the preview image;
acquiring AR object information associated with the detected object;
displaying an AR object in association with the detected object, based on the acquired AR object information; and
changing display of the AR object based on detecting movement of the detected object.

19. The method of claim 11, wherein applying the space-based drawing comprises:
generating a world coordinate system according to a position of the electronic device;
detecting an AR object input;
determining coordinates of the AR object with respect to the generated world coordinate system; and storing AR object information including the determined coordinates in a memory.

20. The method of claim 11, wherein the method comprises:
displaying an AR object to which the space-based drawing is applied on the preview image;
detecting a movement of the electronic device by a motion sensor; and changing display of the AR object based on the detected movement of the electronic device.

* * * * *